(12) United States Patent
Bailey et al.

(10) Patent No.: US 10,839,622 B2
(45) Date of Patent: Nov. 17, 2020

(54) AIRCRAFT MAINTENANCE CONDITION DETECTION

(71) Applicant: THE BOEING COMPANY, Chicago, IL (US)

(72) Inventors: Allan D. Bailey, Mesa, AZ (US); Thomas G. Valentine, Phoenix, AZ (US); James J. Tusick, Tempe, AZ (US); Daniel P. Paulat, Gilbert, AZ (US)

(73) Assignee: THE BOEING COMPANY, Chicago, IL (US)

( * ) Notice: Subject to any disclaimer, the term of this patent is extended or adjusted under 35 U.S.C. 154(b) by 196 days.

(21) Appl. No.: 15/937,064

(22) Filed: Mar. 27, 2018

(65) Prior Publication Data

US 2019/0304212 A1 Oct. 3, 2019

(51) Int. Cl.
*G07C 5/08* (2006.01)
*G07C 5/00* (2006.01)
*G06Q 30/06* (2012.01)
*G06Q 10/00* (2012.01)
*G06F 16/248* (2019.01)

(52) U.S. Cl.
CPC ......... *G07C 5/0808* (2013.01); *G06F 16/248* (2019.01); *G06Q 10/20* (2013.01); *G06Q 30/0633* (2013.01); *G07C 5/006* (2013.01)

(58) Field of Classification Search
CPC ..... G07C 5/0808; G07C 5/006; G06F 16/248; G06Q 10/20; G06Q 30/0633
USPC ...................................................... 701/31.4
See application file for complete search history.

(56) References Cited

U.S. PATENT DOCUMENTS

| 7,702,435 | B2 | 4/2010 | Pereira et al. | |
| 8,452,475 | B1 | 5/2013 | West et al. | |
| 8,914,205 | B2 | 12/2014 | Chandran et al. | |
| 9,529,359 | B1* | 12/2016 | Annan | G05D 1/0016 |
| 10,399,706 | B1* | 9/2019 | Hanlon | G07C 5/0841 |

(Continued)

OTHER PUBLICATIONS

"Rolls-Royce launches IntelligentEngine," Rolls Royce, Feb. 5, 2018, <https://www.rolls-royce.com/media/press-releases/yr-2018/05-02-2018-rr-launches-intelligentengine.aspx#latest-updates>, pp. 1-3.

(Continued)

*Primary Examiner* — Fadey S. Jabr
*Assistant Examiner* — Naeem Taslim Alam
(74) *Attorney, Agent, or Firm* — Moore IP Law

(57) ABSTRACT

A device includes a transceiver, a processor, a network interface, and a display interface. The transceiver is configured to receive health data from an aircraft. The processor is configured to determine whether the health data indicates a maintenance condition. The network interface is configured to send a first query to a maintenance database and to receive a first response to the first query indicating a list of parts associated with the maintenance condition. The network interface is also configured to send a second query to a historical maintenance database based on the list of parts and to receive a second response to the second query indicating failure rates of the parts. The display interface is configured to provide a graphical user interface (GUI) to a display. The processor is configured to generate the GUI indicating the list of parts ordered based on the failure rates.

20 Claims, 12 Drawing Sheets

(56) References Cited

U.S. PATENT DOCUMENTS

| | | | |
|---|---|---|---|
| 2010/0042283 A1* | 2/2010 | Kell | G06Q 10/06 |
| | | | 701/29.3 |
| 2014/0156166 A1* | 6/2014 | Moeckly | F02D 45/00 |
| | | | 701/102 |
| 2016/0155339 A1* | 6/2016 | Saad | H04L 69/18 |
| | | | 701/25 |
| 2016/0233948 A1* | 8/2016 | Le Bigot | H04B 7/18506 |
| 2018/0225651 A1* | 8/2018 | Stone | H04L 9/3239 |
| 2018/0322714 A1* | 11/2018 | Gennotte | B64F 5/60 |
| 2018/0341794 A1* | 11/2018 | Balasubramanian | G06Q 10/20 |
| 2019/0087789 A1* | 3/2019 | Barkat | G06N 5/04 |
| 2019/0158597 A1* | 5/2019 | Evans | B64C 39/024 |
| 2019/0197800 A1* | 6/2019 | Lewis | G07C 5/0808 |

OTHER PUBLICATIONS

"ACARS," Wikipedia, Jan. 10, 2018 <https://en.wikipedia.org/w/index.php?title=ACARS&oldid=819593523> 5 pgs.

"Aircraft Information System," Safran Electronics & Defense, Jan. 19, 2018, <https://www.safran-electronics-defense.com/aerospace/helicopters/aircraft-information-system>, 2 pgs.

"Meggitt moves into real time flight data transmission," Jan. 19, 2018, <https://www.meggitt.com/news/meggitt-moves-into-real-time-flight-data-transmission/>, pp. 1-4.

"NASA Aircraft Management Information System," National Aeronautics and Space Administration, MSC-24723-1, Sep. 2, 2010, <www.nasa.gov>, 2 pgs.

* cited by examiner

AIRCRAFT MAINTENANCE CONDITION DETECTION

FIELD OF THE DISCLOSURE

The present disclosure is generally related to aircraft maintenance condition detection.

BACKGROUND

Generally, a technician performs aircraft maintenance by inspecting an aircraft on the ground at an airport. If the inspection reveals that a maintenance condition exists, the technician attempts to diagnose a cause of the maintenance condition. For example, the technician determines that the maintenance condition could be caused by multiple aircraft parts. If the aircraft parts are not readily available at the airport, the aircraft owner has to incur the costs (e.g., time, money, or both) associated with ordering the aircraft parts to the airport or incur the costs associated with flying the aircraft to another location where the aircraft parts are available.

SUMMARY

In a particular implementation, a device includes a transceiver, a processor, a network interface, and a display interface. The transceiver is configured to receive health data from an aircraft. The processor is configured to determine whether the health data indicates a maintenance condition. The network interface is configured, responsive to the health data indicating the maintenance condition, to send a first query to a maintenance database. The first query is based on the health data and an identifier of the aircraft. The network interface is also configured to receive a first response to the first query from the maintenance database. The first response indicates a list of parts associated with the maintenance condition. The network interface is further configured to send a second query to a historical maintenance database. The second query is based on the list of parts. The network interface is also configured to receive a second response to the second query from the historical maintenance database. The second response indicates failure rates of the parts. The display interface is configured to provide a graphical user interface (GUI) to a display. The processor is configured to generate the GUI indicating the list of parts ordered based on the failure rates.

In another particular implementation, a method includes receiving health data at a device from an aircraft. The method also includes determining, at the device, that the health data indicates a maintenance condition. The method further includes, in response to determining that the health data indicates the maintenance condition, sending a first query from the device to a maintenance database. The first query is based on the health data and an identifier of the aircraft. The method also includes receiving a first response to the first query at the device from the maintenance database. The first response indicates a list of parts associated with the maintenance condition. The method further includes sending a second query from the device to a historical maintenance database. The second query is based on the list of parts. The method also includes receiving a second response to the second query at the device from the historical maintenance database. The second response indicates failure rates of the parts. The method further includes generating, at the device, a graphical user interface (GUI) indicating the list of parts ordered based on the failure rates.

A computer-readable storage device stores instructions that, when executed by a processor, cause the processor to perform operations including receiving health data from an aircraft. The operations also include determining that the health data indicates a maintenance condition. The operations further include, in response to determining that the health data indicates the maintenance condition, sending a first query to a maintenance database. The first query is based on the health data and an identifier of the aircraft. The operations also include receiving a first response to the first query from the maintenance database. The first response indicates a list of parts associated with the maintenance condition. The operations further include sending a second query to a historical maintenance database. The second query is based on the list of parts. The operations also include receiving a second response to the second query from the historical maintenance database. The second response indicates failure rates of the parts. The operations further include generating a graphical user interface (GUI) indicating the list of parts ordered based on the failure rates.

The features, functions, and advantages described herein can be achieved independently in various implementations or may be combined in yet other implementations, further details of which can be found with reference to the following description and drawings.

DETAILED DESCRIPTION

Figure 1:
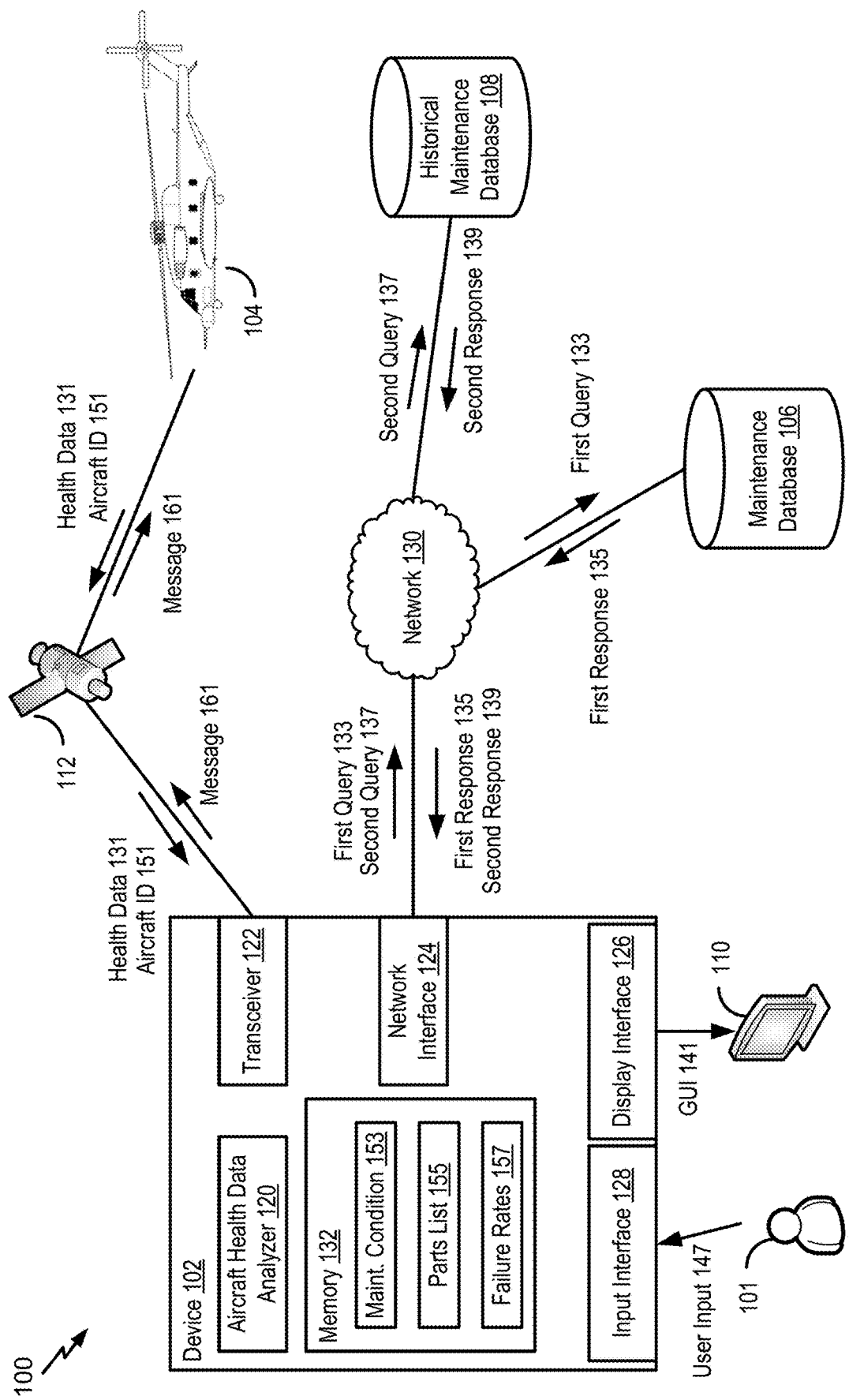
FIG. 1 is a block diagram that illustrates a system operable to detect one or more maintenance conditions in an aircraft and perform aircraft maintenance.

Implementations described herein are directed to aircraft maintenance condition detection. A device (e.g., a maintenance computer) includes an aircraft health data analyzer. In a particular example, the device is located on the ground, such as at an airport. In another example, the device is portable or mobile, such as in an aircraft. The device could be located at an aircraft monitoring location, an aircraft maintenance management location, or any combination thereof. The device is coupled to a maintenance database and to a historical maintenance database. The maintenance database is configured to maintain a listing of parts that could potentially be associated with various maintenance conditions. For example, the maintenance database stores text of technical orders and/or aircraft maintenance manuals. The historical maintenance database is configured to maintain records of failure (or replacement) of various aircraft parts. For example, the historical maintenance database stores information indicating dates at which various aircraft parts have been replaced at various aircraft. To illustrate, the historical maintenance database indicates replacement dates of all or major aircraft components for each aircraft of a fleet or multiple fleets (e.g., fleets associated with different airlines or military organizations). The historical maintenance database could indicate replacement dates that occurred during a particular time frame (e.g., the previous 30 years).

The health data analyzer monitors health data received from an aircraft. The health data indicates at least a location of the aircraft, sensor data from sensors on the aircraft, or on-board analysis data from analysis performed on the aircraft. In a particular example, the health data is received during normal operation (as compared to during testing) of the aircraft. To illustrate, the health data is received from the aircraft in real-time (or near real-time) while the aircraft is in-flight. The health data analyzer determines whether the health data indicates a maintenance condition, such as a higher than threshold temperature reading by a temperature sensor at the aircraft.

The health data analyzer, in response to detecting the maintenance condition, queries the maintenance database to identify aircraft parts that could potentially cause the maintenance condition. For example, an aircraft maintenance manual stored at the maintenance database indicates that a higher than threshold temperature reading by a particular temperature sensor could be caused by a malfunction in the temperature sensor, an increase in temperature in an aircraft part that is located proximate to the temperature sensor, a malfunction in wiring that connects the temperature sensor to a data collection device of the aircraft, a malfunction in the data collection device, a malfunction in a software package of the data collection device, or any combination thereof. The health data analyzer receives a list of parts from the maintenance database. For example, the parts indicated in the list as potentially associated with the maintenance condition include the temperature sensor, the aircraft part that is proximate to the temperature sensor, the wiring that connects the temperature sensor to the data collection device of the aircraft, the data collection device, the software package (e.g., a software update), or any combination thereof.

The health data analyzer queries the historical maintenance database to determine which of the parts indicated by the list are more likely to be a cause of the maintenance condition. For example, the health data analyzer receives failure rates of the parts indicated in the list. The parts with a relatively higher failure rate may be more likely to be a cause of the maintenance condition. The failure rates correspond to replacement rates, predicted replacement dates, remaining proportions of predicted replacement intervals, or any combination thereof. In a particular example, a type of aircraft part that is replaced more frequently across an aircraft fleet is more likely to be a cause of the maintenance condition. A type of aircraft part that is replaced more frequently could have a shorter average time to failure (or replacement).

In a particular implementation, the health data analyzer determines a predicted replacement schedule of the parts indicated by the list. For example, the historical maintenance database determines that a particular type of aircraft part is replaced once in a time interval (e.g., a year) on average on various aircraft. The historical maintenance database indicates that a particular aircraft part of the particular type was most recently replaced (or installed) at a first date at the aircraft. The historical maintenance database indicates that the particular aircraft part is predicted to be due for replacement at a second date that is based on the first date and the time interval (e.g., second date=first date+time interval). The predicted replacement schedule indicates that the particular aircraft part is predicted to be due for replacement at the second date. In a particular aspect, a first aircraft part that is due for replacement earlier than a second aircraft part is more likely to be a cause of the maintenance condition than the second aircraft part.

In a particular example, the historical maintenance database determines that a first type of aircraft part is replaced once in a first time interval (e.g., once a week) on average and that a second type of aircraft part is replaced once in a second time interval (e.g., once a year) on average. The predicted replacement schedule indicates that an aircraft part has a particular proportion of a corresponding replacement time interval remaining until a predicted replacement date. An aircraft part having a lower proportion of a corresponding replacement time interval remaining is more likely to be a cause of the maintenance condition. For example, a first aircraft part of the first type has a first number of days (e.g., 6 days) remaining to a first predicted replacement date (e.g., a first previous replacement date+the first time interval). The first number of days (e.g., 6 days) corresponds to a first proportion (e.g., $6/7$) of the first time interval (e.g., 7 days). A second aircraft part of the second type has a second number of days (e.g., 6 months) remaining to a second predicted replacement date (e.g., a second previous replacement date+the second time interval). The second number of days (e.g., 6 months) corresponds to a second proportion (e.g., $1/2$) of the second time interval (e.g., 1 year). The predicted replacement schedule indicates that the first aircraft part has the first proportion of the first time interval remaining, that the second aircraft part has the second proportion of the second time interval remaining, or any combination thereof. In a particular aspect, the second aircraft part with a lower proportion (e.g., $1/2$) remaining of the corresponding replacement interval is more likely to be a cause of the maintenance condition.

The health data analyzer generates a graphical user interface (GUI) indicating a sorted list of the parts ordered by failure rate (e.g., from a highest or most probable failure rate to a lowest or least probable failure rate). The health data analyzer is configured to provide the GUI to a display. The GUI may enable a user (e.g., an engineer or a technician) to determine that the maintenance condition is detected at the aircraft and to determine, based on the order of the parts, which parts are more likely to be a cause for the maintenance condition. The GUI enables the user to select one or more of the parts for replacement based on the relative failure rates. For example, the user may reduce maintenance costs by not selecting parts for replacement that are less likely to be a cause of the maintenance condition. The GUI enables the user to select a maintenance location based on the selected parts, and to re-route the aircraft to the maintenance location. For example, the user can select a maintenance location with a lower cost of replacing the selected parts.

The health data analyzer is configured to generate a maintenance request, one or more supply requests, or any combination thereof, in response to receiving the user selection of the one or more parts. The health data analyzer is configured, e.g., in response to receiving a user input, to send the maintenance request to the maintenance location to schedule maintenance of the aircraft. The health data analyzer is configured, e.g., in response to receiving a user input, to send the supply requests to supplier devices to request parts to be supplied to the maintenance location. The health data analyzer is configured to send a message to the crew of the aircraft that indicates the maintenance condition and indicates that the aircraft is being re-routed to the maintenance location. The maintenance condition may thus be detected and aircraft parts that are a likely cause identified, while the aircraft is in-flight prior to (or without) an inspection on the ground. The aircraft can be re-routed to the maintenance location for repairs without delay or costs associated with performing the inspection on the ground.

FIG. 1 is a block diagram of a system 100 that is operable to perform aircraft maintenance condition detection. The system 100 includes a device 102 communicatively coupled, via a network 130, to a maintenance database 106, a historical maintenance database 108, or both. The network 130 includes a wired network, a wireless network, or any combination thereof. For example, a maintenance facility (e.g., a stationary or permanent facility) includes the device 102 and the device 102 is communicatively coupled to multiple network paths, such as a first network path via the network 130, and a second network path via one or more satellites 112. It should be understood that the device 102 is described as coupled, via the network 130, to the maintenance database 106, the historical maintenance database 108, or both, as an illustrative example. In some implementations, the device 102 is communicatively coupled to a database (e.g., the maintenance database 106, the historical maintenance database 108, or both) independently of the network 130. For example, the device 102 is directly coupled to or integrated with the database (e.g., a locally stored database). In a particular example, a mobile facility (e.g., a temporary facility or a remote facility) includes the device 102 and the device 102 is communicatively coupled to a network path via one or more satellites and does not have access to the network 130. In a particular example, the maintenance database 106, the historical maintenance database 108, or both, are stored as one or more look-up tables at the device 102. As another example, a storage device includes the maintenance database 106, the historical maintenance database 108, or both, and the device 102 is communicatively coupled to (e.g., includes) the storage device. The device 102 may be communicatively coupled, via a satellite 112, to an aircraft 104.

It should be noted that in the following description, various functions performed by the system 100 of FIG. 1 are described as being performed by certain components or modules. However, this division of components and modules is for illustration only. In an alternate aspect, a function performed by a particular component or module is divided amongst multiple components or modules. Moreover, in an alternate aspect, two or more components or modules of FIG. 1 are integrated into a single component or module. In a particular aspect, one or more functions described herein as performed by the device 102 are divided amongst multiple devices (e.g., the device 102, a central server, a distributed system, or any combination thereof). Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The device 102 includes an aircraft health data analyzer 120, a memory 132, an input interface 128, a display interface 126, a network interface 124, a transceiver 122, or any combination thereof. The display interface 126 is configured to be communicatively coupled to a display 110. In a particular aspect, the display 110 is external to the device 102. In an alternate aspect, the display 110 is internal to the device 102. The input interface 128 is configured to be communicatively coupled to an input device, such as a keyboard, a mouse, a motion sensor, a camera, or a microphone. The transceiver 122 is configured to communicate, via the satellite 112, with one or more aircraft, such as the aircraft 104. In a particular aspect, the aircraft 104 includes a manned aerial vehicle, such as a helicopter or an airplane. In an alternate aspect, the aircraft 104 includes an unmanned aerial vehicle. The network interface 124 is configured to communicate, via the network 130, with the maintenance database 106, the historical maintenance database 108, or both.

The maintenance database 106 is configured to maintain data which indicates parts that could potentially be associated with various maintenance conditions. For example, the maintenance database 106 may include text of technical orders, maintenance manuals, or any combination thereof, associated with the aircraft 104. The historical maintenance database 108 is configured to maintain records of replacement (or installation) of various aircraft parts on multiple aircraft (e.g., an aircraft fleet). The aircraft health data analyzer 120 is configured to determine whether the health data 131 indicates a maintenance condition 153, such as a higher than threshold temperature reading by a temperature sensor at the aircraft 104. The aircraft health data analyzer 120 is configured to query the maintenance database 106 for a parts list 155 indicating parts that could potentially be associated with the maintenance condition 153. The aircraft health data analyzer 120 is configured to query the maintenance database 106 for failure rates 157 associated with the parts indicated in the parts list 155. The failure rates 157 are based on replacement rates associated with the parts, predicted replacement dates of the parts, remaining proportions of replacement intervals corresponding to the parts, or any combination thereof. In a particular example, the aircraft health data analyzer 120 is configured to generate a graphical user interface (GUI) 141 indicating the parts of the parts list 155 in order of the failure rates 157 (e.g., from the highest failure rate to the lowest failure rate). The GUI 141 indicates which parts of the parts list 155 are more likely to be a cause of the maintenance condition 153. For example, a first aircraft part associated with a higher failure rate is more likely to be a cause of the maintenance condition 153 than a second aircraft part associated with a lower failure rate. The aircraft health data analyzer 120 is configured to provide the GUI 141 to the display 110.

During operation, one or more sensors aboard the aircraft 104 take measurements at various times. For example, a temperature sensor located in proximity to an aircraft part (e.g., a windshield) performs a temperature measurement at take-off, at various times (e.g., intermittently) during flight, and at landing. A data collection device aboard the aircraft 104 receives the measurements from the sensors and stores the measurements in a memory with timestamps, aircraft operation modes, an identifier of the corresponding sensors, or any combination thereof. For example, the data collection device stores the sensor data in the memory indicating that a first temperature measurement is received from the temperature sensor at a first time during a take-off mode, a second temperature measurement is received from the temperature sensor at a second time during a cruise mode, a third temperature measurement is received from the temperature sensor at a third time during a landing mode, or any combination thereof. In a particular aspect, the measurements are performed at a first measurement frequency, such as at a particular time interval (e.g., one measurement per minute), at a change in the operation mode of the aircraft 104, or any combination thereof. The health data 131 includes a subset of the measurements corresponding to a first data sampling frequency (e.g., one measurement per 10 minutes).

A data analyzer aboard the aircraft 104 is configured to generate on-board analysis data by analyzing the sensor data. In a particular example, the data analyzer determines a rate of temperature increase based on the temperature readings and stores the rate of temperature increase in the memory.

The aircraft 104 transmits the health data 131 to the device 102 at a particular time. In a particular implementation, the device 102 is on the ground and the aircraft 104 transmits the health data 131 during flight via the satellite 112 to the device 102. In an alternative implementation, the device 102 is portable or mobile. For example, the aircraft 104 includes the device 102 and the data analyzer aboard the aircraft 104 provides the health data 131 to the device 102. In a particular example, the device 102 includes an aircraft monitoring device, an aircraft maintenance management device, or both. In a particular aspect, the particular time is based on a configuration setting, a default setting, an operation mode of the aircraft 104, detection of the satellite 112, or any combination thereof. For example, the aircraft 104 transmits the health data 131 in response to detecting that the satellite 112 is within communication range of the aircraft 104 and determining that the aircraft 104 has not transmitted the health data 131 within a particular duration (e.g., 10 minutes). In a particular aspect, the particular duration is indicated by the configuration setting. In a particular aspect, the aircraft 104 transmits the health data 131 to the device 102 in response to receiving a request from the device 102. For example, the device 102 sends the request to the aircraft 104 in response to receiving a user input, determining that the health data 131 has not been received from the aircraft 104 within a particular duration (e.g., 10 minutes), or both. The health data 131 includes the sensor data, the on-board analysis data, or any combination thereof.

In a particular aspect, the aircraft 104 uses short burst data transmission to communicate with the device 102. For example, the aircraft 104 divides the health data 131 into data packets and transmits the data packets, via the satellite 112, to the device 102. In a particular example, a size of the data packets is based on a type of data included in the data packets, a number of messages generated by the aircraft 104, a communication protocol supported by the aircraft 104, a communication protocol supported by the device 102, a default value, a configuration setting, or any combination thereof. In a particular aspect, each of the data packets has the same size. In an alternate aspect, a first size of a first data packet is distinct from a second size of a second data packet. In a particular aspect, the data packets are encrypted prior to transmission by the aircraft 104. For example, the data packets are encrypted based on an encryption protocol supported by the aircraft 104, an encryption protocol supported by the device 102, or both. Although a single satellite 112 is shown in FIG. 1, it should be understood that the aircraft 104 could transmit the data packets via multiple satellites to the device 102. The aircraft 104 transmits an aircraft identifier (ID) 151 (e.g., a unique identifier) of the aircraft 104 concurrently with the health data 131. For example, the aircraft 104 transmits the aircraft ID 151 concurrently with the health data 131 to indicate that the health data 131 is associated with the aircraft 104 corresponding to the aircraft ID 151.

The transceiver 122 receives the health data 131, the aircraft ID 151, or both. The aircraft health data analyzer 120 analyzes the health data 131 to determine whether the maintenance condition 153 has been detected. In a particular example, the health data 131 indicates a temperature measurement, a rate of temperature increase, or both. In this example, the aircraft health data analyzer 120 determines that the maintenance condition 153 is detected in response to determining that the temperature measurement exceeds a first threshold, the rate of temperature increase exceeds a second threshold, or both.

In a particular example, the maintenance database 106 includes an aircraft parts table, a parts table, and a condition table. The aircraft parts table includes an aircraft ID column and a part ID column that indicate identifiers of parts included in various aircraft. The parts table includes a part ID column and a part type column that indicate part types of various aircraft parts. The condition table includes a part type column and a condition ID column that indicates types of aircraft parts associated with various maintenance conditions.

In a particular example, the maintenance database 106 stores data that is based on an aircraft maintenance manual, aircraft configuration data, or any combination thereof. To illustrate, the aircraft parts table stores aircraft configuration data that indicates part IDs of aircraft parts that are included in the aircraft 104 corresponding to the aircraft ID 151. The parts table stores aircraft configuration data that indicates types of parts that correspond to the part IDs. In a particular example, the aircraft maintenance manual indicates that the maintenance condition 153 (e.g., a higher than threshold temperature reading from a temperature sensor) could be caused by a malfunction in a particular type of aircraft part (e.g., a temperature sensor type), an increase in temperature of a second type of aircraft part that is located proximate to the temperature sensor, a malfunction in wiring that connects the particular type of aircraft part to a data collection device of the aircraft, a malfunction in the data collection device, a malfunction in the type of software package (e.g., a virus in the software package or an out-of-date software package) of the data collection device, or any combination thereof. In this example, the aircraft parts table indicates that the maintenance condition 153 could be caused by the particular type of aircraft part, the second type of aircraft part, the wiring, the data collection device, the type of software package, or any combination thereof. In a particular example, a type of software package (e.g., a temperature sensor application) of the data collection device is associated with the temperature sensor and the aircraft parts table indicates that a malfunction in the type of software package (e.g., a software virus or an out-of-date version) could be a cause of the maintenance condition 153.

The aircraft health data analyzer 120 generates a first query 133 in response to determining that the health data 131 indicates the maintenance condition 153. The first query 133 is based on the maintenance condition 153, the aircraft ID 151, or both. The first query 133 (e.g., "select part type from condition table join parts table on condition table.part type=parts table.part type join aircraft parts table on aircraft parts table.part ID=parts table.part ID where condition table.condition ID=maintenance condition 153 and aircraft parts table.aircraft ID=aircraft ID 151") requests a search for types of aircraft parts that are associated with the maintenance condition 153. The aircraft health data analyzer 120 initiates transmission of the first query 133 to the maintenance database 106. For example, an interface (e.g., the network interface 124, an application interface, a database interface, or any combination thereof) provides the first query 133 to the maintenance database 106. The maintenance database 106 generates the parts list 155 based on the first query 133. In this example, executing the first query 133 generates the parts list 155 indicating types of parts that are included in the aircraft 104 and that are associated with the maintenance condition 153.

In a particular example, the maintenance database 106 includes an aircraft table, an aircraft type parts type table, and the condition table. The aircraft table includes an aircraft ID column and an aircraft type column that indicate the aircraft type of various aircraft. The aircraft type parts type table includes an aircraft type column and a part type column that indicates types of aircraft parts included in various aircraft types. The aircraft table indicates that the aircraft ID 151 corresponds to a particular aircraft type. The aircraft type parts type table includes aircraft configuration data indicating that various aircraft part types included in aircrafts of the particular aircraft type. In this example, the first query requests a search for the same type of aircraft parts as are associated with the same aircraft type as the aircraft 104 (e.g., "select part type from condition table join aircraft type parts type table on aircraft type parts type table.part type=condition table.part type join aircraft table on aircraft table.aircraft type=aircraft type parts type table.aircraft type where condition table.condition ID=maintenance condition 153 and aircraft table.aircraft ID=aircraft ID 151"). Executing the first query 133 generates the parts list 155 including indicating types of parts that are associated with the same aircraft type as the aircraft 104 and that are associated with the maintenance condition 153. It should be understood that particular tables, particular columns, and particular queries are provided as illustrative examples. In other implementations, the maintenance database 106 stores various data structures and the aircraft health data analyzer 120 uses various queries to determine the parts list 155 based on the data stored in the maintenance database 106.

The aircraft health data analyzer 120 receives a first response 135 from the maintenance database 106. For example, an interface (e.g., the network interface 124, an application interface, a database interface, or any combination thereof) receives the first response 135 from the maintenance database 106. The first response 135 includes the parts list 155. It should be understood that a list is described as an illustrative example. In other implementations, the first response 135 uses other data structures (e.g., a set, an array, or a bitmap) to indicate the types of parts that are associated with the maintenance condition 153.

In a particular example, the historical maintenance database 108 includes a parts failure table and a parts table. The parts failure table includes a part ID column and a timestamp indicating failure/replacement times of various aircraft parts. For example, a first aircraft part included in a first aircraft is replaced with a replacement first aircraft part on a first date and a second aircraft part included in a second aircraft is replaced with a replacement second aircraft part on a second date. The historical maintenance database 108 indicates a first part ID of the first aircraft part (e.g., a particular temperature sensor) and the first date. The historical maintenance database 108 also indicates a second part ID of the second aircraft part (e.g., a particular windshield) and the second date. The parts table indicates that the first aircraft part corresponding to the first part ID is of a first type of aircraft part (e.g., a temperature sensor type) and that the second aircraft part corresponding to the second part ID is of a second type of aircraft part (e.g., a windshield type).

The aircraft health data analyzer 120 generates a second query 137 in response to receiving the first response 135. The second query 137 is based on the parts list 155. The second query 137 (e.g., "select count (part type), part type from parts table join parts failure table on parts failure table.part ID=parts table.part ID where parts table.part type in parts list 155 and parts failure table.replacement timestamp>start time group by parts table.part type") requests failure rates (e.g., replacement rates) over a time period of the type of aircraft parts indicated in parts list 155. The aircraft health data analyzer 120 initiates transmission of the second query 137 to the historical maintenance database 108. For example, an interface (e.g., the network interface 124, an application interface, a database interface, or any combination thereof) provides the second query 137 to the historical maintenance database 108.

The historical maintenance database 108 generates the failure rates 157 based on the second query 137. In this example, executing the second query 137 generates the failure rates 157 associated with aircraft part types included in the parts list 155. In a particular aspect, the parts list 155 includes a first aircraft part type (e.g., a temperature sensor type) and a second aircraft part type (e.g., a windshield type). The failure rates 157 indicate a first count of first aircraft parts of the first aircraft part type and a second count of second aircraft parts of the second aircraft part type. The historical maintenance database 108 indicates that each of the first aircraft parts and the second aircraft parts has failed or has been replaced in a time period subsequent to the start time. For example, the failure rates 157 indicates that a first count (e.g., 3) of windshields have been replaced in the time period (e.g., last one year) and a second count (e.g., 50) of temperature sensors have been replaced in the time period in an aircraft fleet. The first count corresponds to a first failure rate of windshields and the second count corresponds to a second failure rate of temperature sensors.

It should be understood that the second query 137 requesting replacement rates as failures rates is provided as an illustrative example. In some examples, the second query 137 requests data to determine the failure rates based on predicted replacement dates, remaining proportions of corresponding replacement intervals, the replacement rates, or any combination thereof. In a particular example, the second query 137 requests a first predicted replacement date of a first aircraft part of the aircraft 104 that is of the first aircraft type (e.g., the temperature sensor type). The historical maintenance database 108 determines a first average replacement time interval between replacements of the first aircraft parts of the first aircraft part type (e.g., the temperature sensor type). The historical maintenance database 108 determines a first replacement date (or failure date) at which the first aircraft part was most recently replaced at the aircraft 104. The historical maintenance database 108 determines the first predicted replacement date based on the first replacement date and the first average replacement time interval (e.g., the first predicted replacement date=first replacement date and the first average replacement time interval). The failure rates 157 indicate the first predicted replacement date of the first aircraft part. Similarly, the failure rates 157 indicate a second predicted replacement date of a second aircraft part of the aircraft 104 that has the second aircraft part type (e.g., the windshield type).

In a particular example, the second query 137 requests a first remaining proportion of a corresponding replacement interval of the first aircraft part of the first aircraft type (e.g., the temperature sensor type). The historical maintenance database 108 determines, at a particular date, the first remaining proportion based on the first average replacement time interval and the first predicted replacement date (e.g., the first remaining proportion=(first predicted replacement date−particular date)/first average replacement time interval). The failure rates 157 indicate the first remaining proportion of the corresponding replacement interval of the first aircraft part. Similarly, the failure rates 157 indicate a second remaining proportion a corresponding replacement interval of the second aircraft part of the aircraft 104 that has the second aircraft part type (e.g., the windshield type).

In a particular aspect, the historical maintenance database 108 determines the failure rates 157 based on replacement rates and predicted replacement dates. For example, the historical maintenance database 108 determines a first failure rate (e.g., 50) corresponding to a first aircraft part type (e.g., temperature sensors), a first replacement date (e.g., 1 month ago) of a first aircraft part (e.g., a temperature sensor) at the aircraft 104, and a first predicted replacement date (e.g., in 11 months) of the first aircraft part. The historical maintenance database 108 determines a first weighted failure rate based on the first failure rate (e.g., 50) and the first replacement date (e.g., 1 month ago). For example, if the first aircraft part was recently replaced at the aircraft 104, the first weighted failure rate indicates a lower likelihood that the first aircraft part is a cause of the maintenance condition 153. In this aspect, the historical maintenance database 108 updates the failure rates 157 to indicate that the first aircraft part type is associated with the first failure rate, the first weighted failure rate, the first replacement date, the first predicted replacement date, or a combination thereof.

In a particular aspect, the historical maintenance database 108 determines the failure rates 157 based on replacement rates and remaining proportions of corresponding replacement intervals For example, the historical maintenance database 108 determines a first remaining portion (e.g., $11/12$) of a first average replacement time interval (e.g., once in 12 months) corresponding to the first aircraft part type. The historical maintenance database 108 determines a second weighted failure rate based on the first failure rate (e.g., 50) and the first remaining portion (e.g., $11/12$) of the first average replacement time interval. If a larger portion of the first average replacement interval remains until the first predicted replacement date, the second weighted failure rate indicates a lower likelihood that the first aircraft part is a cause of the maintenance condition 153. In this aspect, the historical maintenance database 108 updates the failure rates 157 to indicate that the first aircraft part type is associated with the first failure rate, the second weighted failure rate, the first remaining portion, or a combination thereof. In a particular aspect, the historical maintenance database 108 updates the failure rates 157 to indicate that the first aircraft part type is associated with the first failure rate, the first weighted failure rate, the first replacement date, the first predicted replacement date, the second weighted failure rate, the first remaining portion, or a combination thereof.

A higher failure rate indicates that the corresponding aircraft part is more likely to be a cause of the maintenance condition 153. It should be understood that particular tables, particular columns, and particular queries are provided as illustrative examples, and in other implementations the historical maintenance database 108 stores various data structures and the aircraft health data analyzer 120 uses various queries to determine the failure rates 157 based on the data stored in the historical maintenance database 108.

The aircraft health data analyzer 120 receives a second response 139 from the historical maintenance database 108. For example, an interface (e.g., the network interface 124, an application interface, a database interface, or any combination thereof) receives the second response 139 from the historical maintenance database 108. The second response 139 indicates the failure rates 157. In a particular aspect, the aircraft health data analyzer 120 updates the parts list 155 to remove one or more aircraft parts (or aircraft part types) that fail to satisfy a failure criterion. For example, the failure rates 157 indicate that a first aircraft part type is associated with a failure rate (e.g., a replacement rate), a weighted failure rate, a replacement date, a predicted replacement date, a remaining portion of a corresponding replacement interval, or a combination thereof. The aircraft health data analyzer 120 determines that the first aircraft part type fails to satisfy a failure criterion in response to determining, at a first date, that the failure rate is lower than a threshold, that a difference between the replacement date and the first date is lower than a threshold, that a difference between the a predicted replacement date and the first data is greater than a threshold, that the first remaining portion is greater than a threshold, or a combination thereof. The aircraft health data analyzer 120, in response to determining that the first aircraft part type fails to satisfy the failure criterion, removes the first aircraft part type from the parts list 155. In a particular aspect, the aircraft health data analyzer 120, subsequent to removing the first aircraft part type from the parts list 155, updates the failure rates 157 to remove data (e.g., the failure rate, the weighted failure rate, the replacement date, the predicted replacement date, the remaining portion, or a combination thereof) corresponding to the first aircraft part type from the failure rates 157. The aircraft health data analyzer 120 generates the GUI 141 indicating the parts list 155 ordered by the failure rates 157. In a particular example, the failure rates 157 received from the historical maintenance database 108 are ordered (in descending order or ascending order) and the aircraft health data analyzer 120 generates the GUI 141 indicating the failure rates 157 and corresponding aircraft part types. In an alternate example, the aircraft health data analyzer 120 generates a sorted parts list by ordering the parts list 155 based on the failure rates 157 and generates the GUI 141 indicating the sorted parts list and the failure rates 157. The aircraft health data analyzer 120 provides the GUI 141 via the display interface 126 to the display 110.

In a particular implementation, the aircraft health data analyzer 120 generates a message 161 based on the parts list 155. For example, the message 161 indicates the aircraft part types indicated in the parts list 155, the failure rates 157, or both. In a particular aspect, the message 161 indicates that the maintenance condition 153 is detected. The transceiver 122 transmits the message 161 to the aircraft 104. A processor at the aircraft 104 generates a GUI based on the message 161 and initiates display of the GUI (not shown) for a pilot. In a particular example, the GUI indicates one or more of the parts list 155, the failure rates 157, or the maintenance condition 153. To illustrate, the GUI alerts the pilot that the maintenance condition 153 (e.g., higher than threshold temperature reading by a particular temperature sensor) is detected at the aircraft 104. In a particular aspect, the pilot may change aircraft flight parameters (e.g., altitude, speed, or both), communicate with ground control, or any combination thereof, based on the information indicated in the GUI.

In a particular implementation, the aircraft health data analyzer 120 sends the message 161 to the aircraft 104 independently of user input. For example, the aircraft health data analyzer 120 sends the message 161 to the aircraft 104 in response to receiving the health data 131, in response to determining that at least one maintenance condition of the aircraft 104 is detected, or both. In an alternate implementation, the aircraft health data analyzer 120 sends the message 161 to the aircraft 104 in response to receiving a user input 147 via the input interface 128 from a user 101. In this implementation, the GUI 141 includes a message field and a send option. In a particular aspect, the message field indicates the message 161. In a particular aspect, the message field is editable by the user 101. For example, the user 101 (e.g., an engineer or a technician) updates the value of the message field to include additional information. The aircraft health data analyzer 120, in response to receiving the user input 147 indicating a selection of the send option, updates the message 161 based on a value of the message field and initiates transmission of the message 161 to the aircraft 104.

The system 100 thus enables detecting the maintenance condition 153 at the aircraft 104, identifying parts that are associated with the maintenance condition 153, and generating the GUI 141 indicating the parts ordered based on the failure rates 157. The GUI 141 enables the user 101 to determine which parts are more likely to be a cause of the maintenance condition 153. The user 101 can select parts to be repaired that have a higher probability of being associated with the maintenance condition 153. The parts can be requested from suppliers, as further described with reference to FIG. 4, prior to the aircraft 104 landing on the ground, expediting the repairs of the aircraft 104 and potentially reducing costs.

Figure 2:
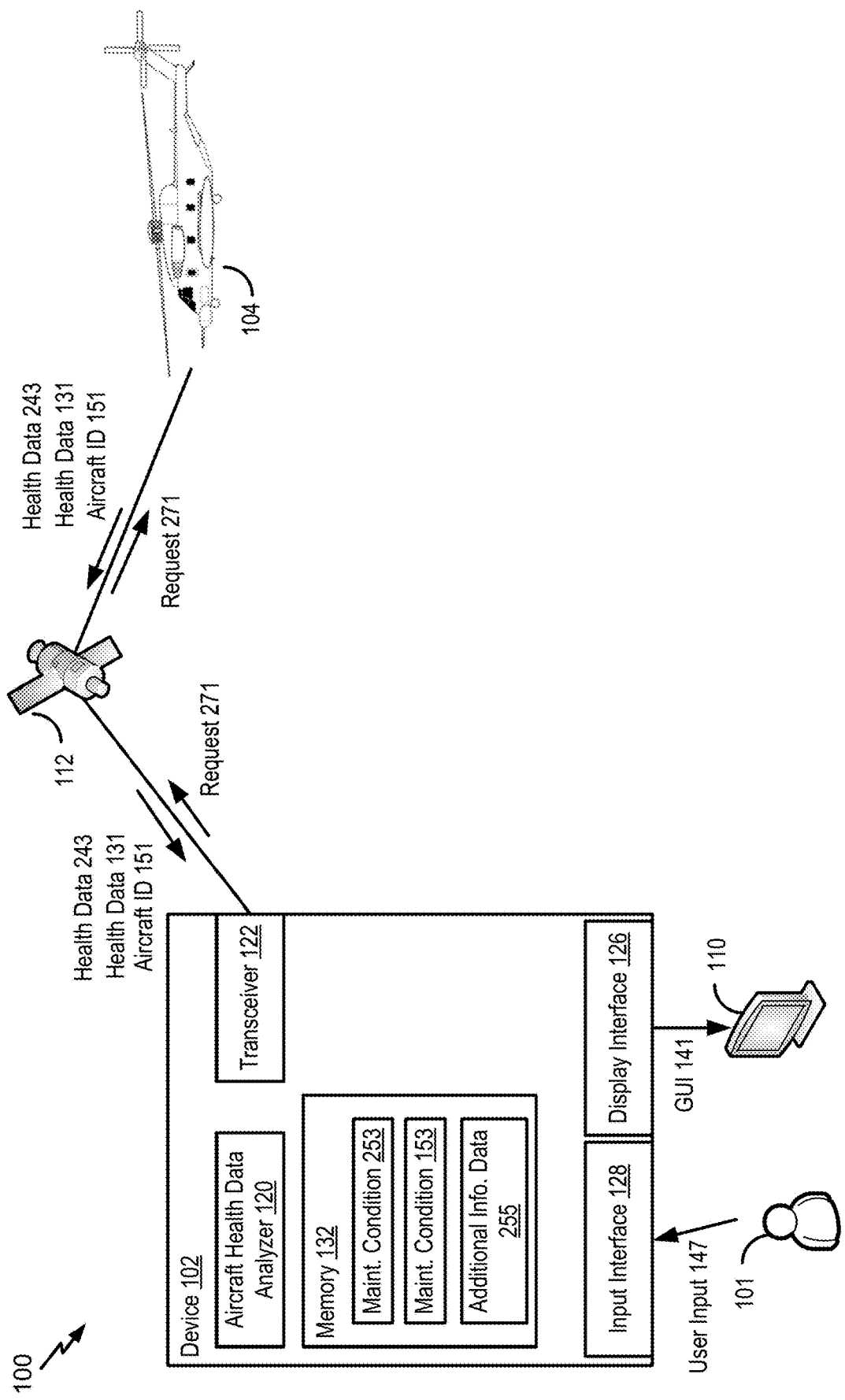
FIG. 2 is a diagram that illustrates an example of an aircraft health data analyzer of the system of FIG. 1 that is operable to communicate a request to an aircraft and to receive health data from the aircraft.

FIG. 2 is a diagram of an illustrative aspect of the system 100. In this aspect, the device 102 receives the health data 131 subsequent to receiving health data 243. For example, the data collection device of the aircraft 104 generates the health data 243 including a first subset of measurements stored in the memory at the aircraft 104. The first subset of measurements includes values sampled at a first data sampling frequency (e.g., one measurement per 10 minutes). The health data 243 includes the first subset of measurements corresponding to the first data sampling frequency, results of a first test, a first value of a first parameter, or any combination thereof. The transceiver 122 receives the health data 243 concurrently with the aircraft ID 151. The aircraft health data analyzer 120 determines whether the health data 243 indicates a maintenance condition 253 (e.g., overall fuel depletion rate is greater than a first threshold).

The aircraft health data analyzer 120 determines whether additional information is to be requested from the aircraft 104 to determine the health state of the aircraft 104. In a particular implementation, the aircraft health data analyzer 120 requests additional information from the aircraft 104 based on additional information data 255 stored in the memory 132. For example, the aircraft health data analyzer 120 selects at least one of a second test, a second data sampling frequency, the first parameter, or a second parameter in response to determining that the additional information data 255 stored in the memory 132 indicates that the maintenance condition 253 maps to the second test, the second data sampling frequency, the first parameter, the second parameter, or any combination thereof. To illustrate, the additional information data 255 indicates that results of performing the second test, sensor data corresponding to the second data sampling frequency, a value of the second parameter, or any combination thereof, is to be requested. For example, the second test indicates that the overall fuel depletion rates at a particular altitude are to be requested, the second data sampling frequency indicates that overall fuel depletion rates during particular time periods (e.g., 5 minute intervals) are to be requested, and the second parameter includes fuel depletion rates of particular fuel tanks are to be requested.

In a particular aspect, the additional information data 255 indicates that the aircraft 104 is to be requested not to send the first parameter. In a particular example, the first parameter (e.g., a communication parameter) is seemingly unrelated to the maintenance condition 253 (e.g., an overall fuel depletion rate that is higher than a first threshold). The health data 131 includes information that is likely to be useful for diagnosis, while bandwidth is conserved by excluding the first parameter from the health data 131. The aircraft health data analyzer 120 generates a request 271 indicating the second test, the second data sampling frequency, the first parameter, the second parameter, or any combination thereof.

In a particular aspect, the maintenance condition 253 indicates a general maintenance condition (e.g., overall fuel depletion rate is greater than a first threshold), and the additional information data 255 indicates additional information (e.g., fuel depletion rates of particular fuel tanks) that could be used to detect a more specific maintenance condition (e.g., fuel depletion rate of a particular fuel tank is greater than a second threshold). The additional information data 255 is based on default data, a configuration setting, a user input, or any combination thereof.

In a particular implementation, the aircraft health data analyzer 120 determines that additional information is to be requested from the aircraft 104 in response to receiving the user input 147. For example, the aircraft health data analyzer 120 generates the GUI 141 indicating the health data 243, the maintenance condition 253, or any combination thereof. In this implementation, the aircraft health data analyzer 120 selects at least one of the second test, the second data sampling frequency, the first parameter, or the second parameter in response to receiving the user input 147 indicating the at least one of the second test, the second data sampling frequency, the first parameter, the second parameter, or any combination thereof. The aircraft health data analyzer 120 generates the request 271 indicating the selected one or more of the second test, the second data sampling frequency, the first parameter, or the second parameter.

The aircraft health data analyzer 120 initiates transmission of the request 271 to the aircraft 104. For example, the transceiver 122 transmits the request 271, via the satellite 112, to the aircraft 104. In a particular implementation, the communication between the transceiver 122 and the aircraft 104 is performed via a single satellite (e.g., the satellite 112). In an alternate implementation, some messages are exchanged between the transceiver 122 and the aircraft 104 using a particular satellite and some messages are exchanged between the transceiver 122 and the aircraft 104 using another satellite. For example, the transceiver 122 receives, at a first time, the health data 243 via at least the satellite 112 from the aircraft 104 and transmits, at a second time, the request 271 via one or more second satellites to the aircraft 104. In this example, the aircraft 104 is within a communication range of the satellite 112 at the first time and within a communication range of the second satellite at the second time.

The data collection device of the aircraft 104 generates the health data 131 in response to receiving the request 271. For example, the health data 131 includes a second subset of measurements stored in the memory at the aircraft 104. The second subset of measurements includes values sampled at the second data sampling frequency (e.g., one measurement per 5 minutes). As another example, the request 271 indicates that the first parameter (e.g., a communication parameter) is to be excluded from the health data 131. The data collection device generates the health data 131 such that the first parameter is excluded from the health data 131. Excluding a value of the first parameter from the health data 131 may reduce an amount of data transmitted from the aircraft 104 to the device 102.

In a particular example, the request 271 indicates that a value of the second parameter is requested. The second parameter (e.g., fuel depletion rates of particular fuel tanks) is excluded from the health data 243. The data collection device determines a second value of the second parameter based on the measurements, the on-board analysis data, or both, stored in the memory at the aircraft 104. In a particular implementation, the data collection device, in response to determining that the second parameter is requested, instructs a sensor to perform a measurement, performs on-board analysis, or both. The data collection device generates the second value of the second parameter based on the measurement, the on-board analysis, or both. The health data 131 includes the second value of the second parameter.

In a particular implementation, the health data 131 includes results of performing the second test (e.g., overall fuel depletion rate at a particular altitude). For example, the data collection device, in response to determining that the request 271 indicates that the second test is to be performed, initiates corresponding sensor measurements, on-board data analysis, or both. In this implementation, the health data 131 indicates the results generated by performing the sensor measurements, the on-board data analysis, or any combination thereof. The transceiver 122 receives the health data 131, the aircraft ID 151, or both, from the aircraft 104. The aircraft health data analyzer 120 analyzes the health data 131 to determine whether the maintenance condition 153 (e.g., a higher than threshold fuel depletion rate of a particular fuel tank) is detected.

The system 100 thus enables sending the request 271 to the aircraft 104 based on detecting the maintenance condition 253. The health data 131 could include more targeted information, as compared to the health data 243, which helps in identification of the maintenance condition 153. For example, the maintenance condition 253 indicates a general condition (e.g., overall fuel depletion rate is greater than an overall threshold), whereas the maintenance condition 153 indicates a more specific condition (e.g., fuel depletion rate of a particular fuel tank is greater than an overall threshold). The health data 131 includes information that is likely to be useful for diagnosis of the more specific condition, while bandwidth is conserved by excluding the first parameter (e.g., unrelated information) from the health data 131. In a particular example, requesting additional information while the aircraft 104 is in-flight relatively soon after detection of the maintenance condition 253 could aid in diagnosis of maintenance conditions that are difficult (e.g., impossible) to diagnose on the ground. For example, the maintenance condition 153 could occur for a short duration, in specific conditions that are difficult to recreate in a test environment, or both.

Figure 3:
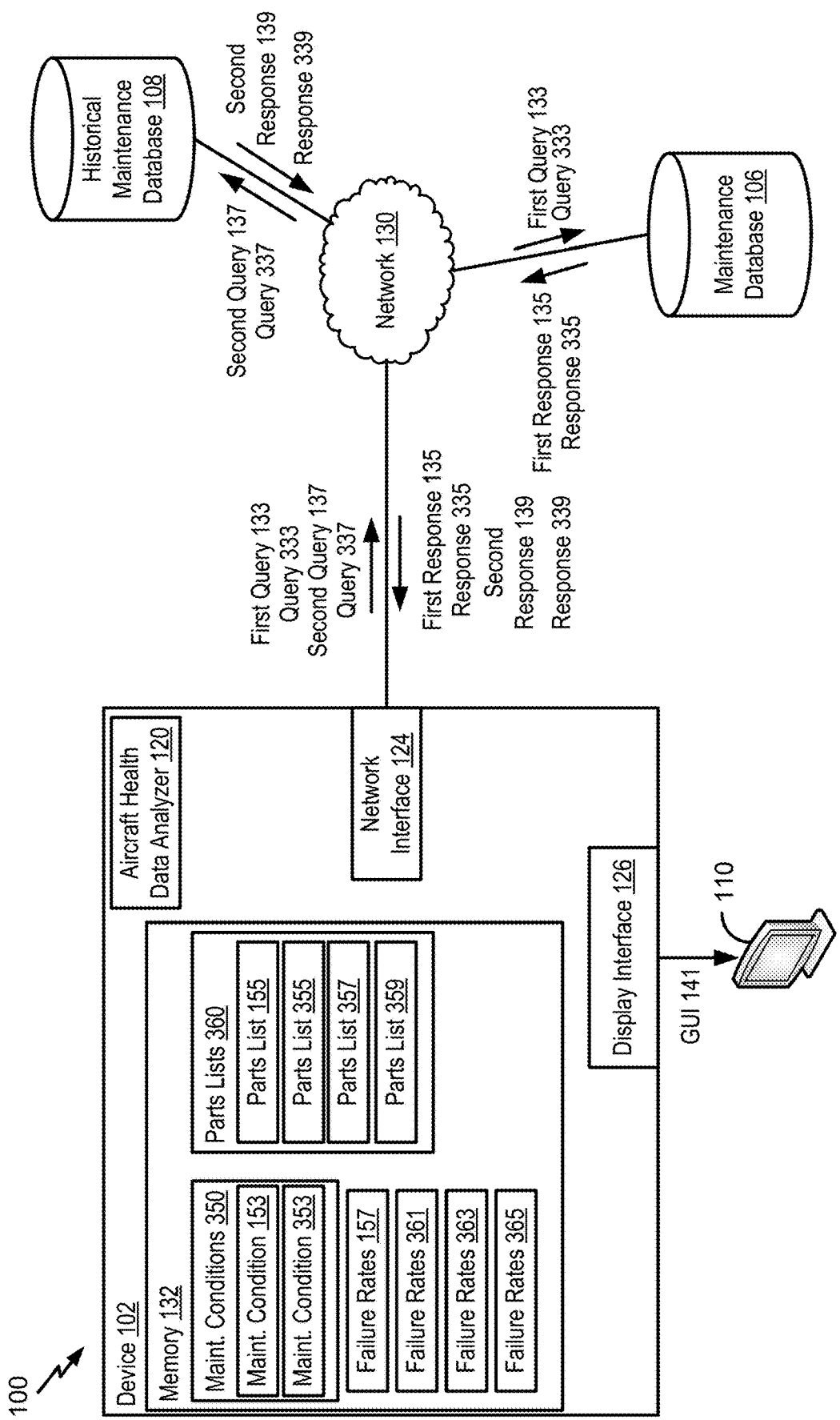
FIG. 3 is a diagram that illustrates an example of an aircraft health data analyzer of the system of FIG. 1 that is operable to detect multiple maintenance conditions in an aircraft.

FIG. 3 is a diagram of an illustrative aspect of the system 100. The aircraft health data analyzer 120 determines that the health data 131 of FIG. 1 indicates a plurality of maintenance conditions 350. For example, the aircraft health data analyzer 120 determines that the health data 131 indicates the maintenance condition 153 (e.g., a higher than threshold temperature measurement from a particular temperature sensor) and a maintenance condition 353 (e.g., a higher than threshold fuel depletion rate of a particular fuel tank).

The aircraft health data analyzer 120 determines a plurality of parts lists 360 corresponding to the maintenance conditions 350. In a particular implementation, the aircraft health data analyzer 120 generates the first query 133 based on the maintenance condition 153, as described with respect to FIG. 1, a query 333 based on the maintenance condition 353, or both. The aircraft health data analyzer 120 sends the first query 133, the query 333, or both, to the maintenance database 106. The maintenance database 106 generates the first response 135 based on the first query 133, as described with reference to FIG. 1, a response 335 based on the query 333, or both. The first response 135 indicates the parts list 155 of aircraft parts that could potentially be associated with the maintenance condition 153. The response 335 indicates a parts list 355 of aircraft parts that could potentially be associated with the maintenance condition 353.

The aircraft health data analyzer 120 generates the second query 137 based on the parts list 155, as described with reference to FIG. 1, a query 337 based on the parts list 355, or both. The aircraft health data analyzer 120 sends the second query 137, the query 337, or both, to the historical maintenance database 108. The historical maintenance database 108 generates the second response 139 based on the second query 137, as described with reference to FIG. 1, a response 339 based on the query 337, or both. The second response 139 indicates the failure rates 157 of the aircraft parts indicated in the parts list 155. The response 339 indicates the failure rates 361 of the aircraft parts indicated in the parts list 355.

In a particular implementation, the aircraft health data analyzer 120 generates a parts list 357 that indicates aircraft parts that are common to each of the parts list 155 and the parts list 355. The aircraft health data analyzer 120 generates failure rates 363 corresponding to the parts list 357 based on the failure rates 157 or the failure rates 361. For example, the parts list 357 indicates a first part that is indicated in each of the parts list 155 and the parts list 355. For example, each of the maintenance condition 153 and the maintenance condition 353 could be caused by the first part. To illustrate, a particular temperature sensor could be proximate to a particular fuel tank that is damaged. The maintenance condition 153 could correspond to a higher than threshold temperature measurement from the particular temperature sensor caused by the overheating and damaged fuel tank. The maintenance condition 353 could correspond to a higher than threshold fuel depletion rate of the damaged fuel tank. In this example, each of the maintenance condition 153 and the maintenance condition 353 is associated with the particular fuel tank. Each of the failure rates 157 and the failure rates 361 includes a first failure rate of the first part (e.g., the particular fuel tank). The aircraft health data analyzer 120 includes the first failure rate in the failure rates 363.

In a particular implementation, the aircraft health data analyzer 120 generates a parts list 359 that includes the parts list 155 and the parts list 355. For example, the parts list 359 includes parts that could cause the maintenance condition 153, the maintenance condition 353, or both. The aircraft health data analyzer 120 generates failure rates 365 corresponding to the parts list 359 based on the failure rates 157 and the failure rates 361. For example, the failure rates 157 include the first failure rate of the first part and a second failure rate of a second part. The failure rates 361 include the first failure rate of the first part and a third failure rate of a third part. The failure rates 365 include the first failure rate, the second failure rate, and the third failure rate.

The aircraft health data analyzer 120 generates the GUI 141 indicating the parts list 155 ordered by the failure rates 157, the parts list 355 ordered by the failure rates 361, the parts list 357 ordered by the failure rates 363, the parts list 359 ordered by the failure rates 365, or any combination thereof, as further described with reference to FIG. 7. The system 100 thus enables identifying aircraft parts that are associated with multiple maintenance conditions, and generating the GUI 141 indicating the aircrafts parts ordered based on failure rates. The GUI 141 enables the user 101 to determine which parts are more likely to be a cause of each of the multiple maintenance conditions or a combination of the multiple maintenance conditions.

Figure 4:
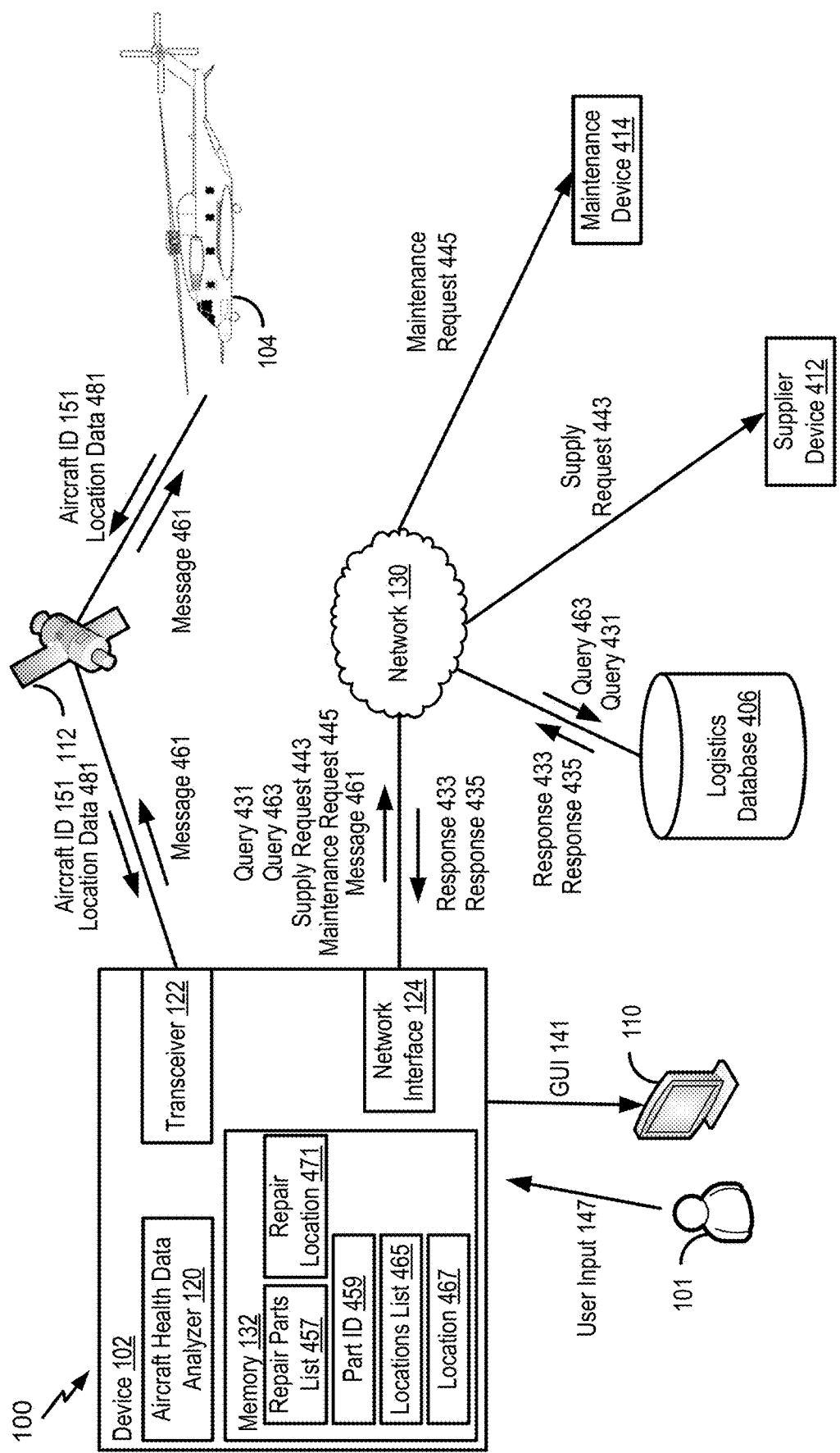
FIG. 4 is a diagram that illustrates examples of communications between an aircraft health data analyzer of the system of FIG. 1 and one or more other devices.

FIG. 4 is a diagram of an illustrative aspect of the system 100. The device 102 is configured to be communicatively coupled to a logistics database 406, a supplier device 412, a maintenance device 414, or any combination thereof. In a particular aspect, the network interface 124 is configured to be communicatively coupled, via the network 130, to the logistics database 406, the supplier device 412, the maintenance device 414, or any combination thereof. In a particular aspect, the device 102 is coupled to the logistics database 406 independently of the network 130. For example, the logistics database 406 is stored at the device 102. In a particular example, the logistics database 406 is stored at a storage device and the device 102 is communicatively coupled to (e.g., includes) the storage device.

The logistics database 406 is configured to maintain availability records for aircraft parts. For example, the logistics database 406 maintains records of locations at which various aircraft parts are available. The logistics database 406 could also maintain records of availability of technicians qualified to replace various aircraft parts, availability of items to be used to replace various aircraft parts, or any combination thereof. In a particular example, the logistics database 406 indicates, for various aircraft parts, locations at which qualified technicians, support equipment, consumables (e.g., rags, oil, fuel, etc.), tools, or any combination thereof, are available. In a particular implementation, the logistics database 406 maintains records of available repair locations.

The supplier device 412 is configured to, in response to receiving a supply request 443 indicating a repair location 471, initiate transportation of an aircraft part, a qualified technician, support equipment, a consumable, a tool, or any combination thereof, to the repair location 471. The maintenance device 414 is configured to, in response to receiving a maintenance request 445, schedule maintenance at the repair location 471.

During operation, the aircraft health data analyzer 120 generates a repair parts list 457. In a particular implementation, the GUI 141 indicates the part list 155, the parts list 355, the parts list 357, the parts list 359, or any combination thereof, as further described with reference to FIG. 7. The aircraft health data analyzer 120, in response to receiving the user input 147 indicating a selection of a part ID 459 of an aircraft part (or a type of aircraft part), adds the part ID 459 to the repair parts list 457. In an alternative implementation, the aircraft health data analyzer 120 adds the part ID 459 to the repair parts list 457 independently of receiving the user input 147. For example, the aircraft health data analyzer 120 adds the part ID 459 to the repair parts list 457 in response to determining that at least one of the failure rates 157, the failure rates 361, the failure rates 363, or the failure rates 365 indicate that the aircraft part having the part ID 459 has a first failure rate and that the first failure rate is greater than a threshold. The threshold is based on a default value, a configuration setting, a user input, or any combination thereof.

In a particular aspect, the aircraft health data analyzer 120 updates the repair parts list 457 to indicate one or more technicians that are qualified to repair the aircraft parts indicated in the repair parts list 457, one or more items that are to be used to repair the aircraft parts indicated in the repair parts list 457, or any combination thereof. For example, the aircraft health data analyzer 120 could send a query to the logistics database 406 indicating the part ID 459 and receive a response from the logistics database 406 indicating one or more repair technicians that are qualified to repair an aircraft part corresponding to the part ID 459, one or more items that are to be used to repair the aircraft part corresponding to the part ID 459, or any combination thereof. In a particular aspect, "an aircraft part corresponding to the part ID 459" refers to an aircraft part of an aircraft part type that is indicated by the part ID 459. The aircraft health data analyzer 120 updates the repair parts list 457 to indicate that the one or more technicians, the one or more items, or any combination thereof, are to be used to repair the aircraft part corresponding to the part ID 459.

The aircraft 104 transmits location data 481, via the satellite 112 or another satellite, to the device 102. In a particular aspect, the aircraft 104 transmits the location data 481 concurrently with transmitting the health data 131 of FIG. 1. In a particular aspect, the aircraft 104 transmits the health data 131 more frequently, with the same frequency, or less frequently than the location data 481. In a particular aspect, the aircraft 104 transmits the aircraft ID 151 of FIG. 1 concurrently with the location data 481. For example, the aircraft 104 transmits the aircraft ID 151 concurrently with the location data 481 to indicate that the location data 481 is associated with the aircraft 104 corresponding to the aircraft ID 151.

The aircraft health data analyzer 120 determines locations at which components (e.g., aircraft parts, technicians, items, or any combination thereof) indicated in the repair parts list 457 are available. The aircraft health data analyzer 120 sends a query 431 to the logistics database 406. For example, an interface (e.g., the network interface 124, an application interface, a database interface, or any combination thereof) sends the query 431 to the logistics database 406. The query 431 indicates a component ID of a component indicated by the repair parts list 457. For example, the query 431 indicates the part ID 459 (e.g., "select locationID from location part table where part ID=part ID 459") corresponding to an aircraft part indicated by the repair parts list 457. The logistics database 406 generates a response 433 in response to receiving the query 431. The response 433 indicates a locations list 465 indicating one or more locations at which the component corresponding to the component ID (e.g., the part ID 459) is available. In a particular implementation, the query 431 indicates a location of the aircraft 104. For example, the query 431 includes the location data 481. In a particular example, the logistics database 406 generates the locations list 465 including one or more locations that are within a threshold distance of the location of the aircraft 104 and at which the component is available. In another example, the logistics database 406 includes a particular count of locations in the locations list 465 that are closest to the location of the aircraft 104 and at which the aircraft part is available. To illustrate, the logistics database 406, in response to determining that the component is available at multiple locations, determines particular locations at which the component is available, orders the particular locations by distance from the location of the aircraft 104, and includes no more than a threshold number (e.g., 10 closest locations) of the particular locations in the locations list 465.

In a particular aspect, the GUI 141 indicates locations at which components (e.g., aircraft parts, technicians, items, or any combination thereof) indicated by the repair parts list 457 are available. For example, the GUI 141 indicates that the component corresponding to the component ID is available at the particular locations indicated by the locations list 465. To illustrate, the GUI 141 indicates that the aircraft corresponding to the part ID 459 is available at the particular locations indicated by the locations list 465.

In a particular aspect, the GUI 141 includes an option to specify the repair location 471. For example, the aircraft health data analyzer 120 sends a query 463 to the logistics database 406. The query 463 indicates the location of the aircraft 104, the locations at which aircraft parts indicate by the repair parts list 457 are available, or any combination thereof. The logistics database 406 generates a response 435 in response to receiving the query 463. The response 435 indicates one or more repair locations that are available (e.g., operational). In a particular aspect, the repair locations are within a threshold distance of the location of the aircraft 104, a threshold distance of one or more locations at which at least a threshold number of components indicated by the repair parts list 457 are available, or any combination thereof. The device 102 receives the response 435 from the logistics database 406. The GUI 141 indicates the repair locations based on the response 435. The aircraft health data analyzer 120, in response to receiving the user input 147 indicating a selection of an option associated with a particular location of the repair locations, designates the particular location as the repair location 471.

In a particular aspect, the aircraft health data analyzer 120 determines the repair location 471 independently of the user input 147. For example, the aircraft health data analyzer 120 selects the repair location 471 by using an optimization algorithm (e.g., a cost optimization algorithm, a distance optimization algorithm, or both) to analyze the repair locations indicated by the response 435.

In a particular aspect, the user 101 selects location from which the components indicated by the repair parts list 457 are to be requested for repair of the aircraft 104. For example, the user 101 selects a location 467 of the locations list 465 for the aircraft part corresponding to the part ID 459. The aircraft health data analyzer 120, in response to receiving the user input 147 indicating a selection of the location 467, designates the location 467 as a supplier of the aircraft part corresponding to the part ID 459. In an alternate aspect, the aircraft health data analyzer 120 designates the location 467 independently of the user input 147. For example, the aircraft health data analyzer 120 selects the location 467 from the locations list 465 based on the repair location 471. To illustrate, the aircraft health data analyzer 120 selects the location 467 based on a distance to the repair location 471, a cost of transporting the aircraft part from the location 467 to the repair location 471, or both.

The aircraft health data analyzer 120 generates supply requests for the components indicated in the repair parts lists 457. In a particular implementation, the GUI 141 includes a requisition option, and the aircraft health data analyzer 120 generates the supply requests in response to receiving the user input 147 indicating a selection of the requisition option. In an alternative implementation, the aircraft health data analyzer 120 generates the supply requests independently of receiving the user input 147. For example, the aircraft health data analyzer 120 generates the supply requests subsequent to determining the supplier locations of the components indicated in the repair parts list 457.

In a particular example, the aircraft health data analyzer 120, in response to determining that the repair parts list 457 includes the component ID and that a particular location is designated as the supplier location for the component corresponding to the component ID, generates the supply request 443 indicating that the component (e.g., aircraft part) corresponding to the component ID (e.g., the part ID 459) is to be supplied from the particular location (e.g., the location 467) to the repair location 471.

In a particular aspect, the particular location (e.g., the location 467) corresponds to a storage building at a facility and the repair location 471 corresponds to a repair hangar at the same facility. In another aspect, the particular location (e.g., the location 467) is in a first facility and the repair location 471 is in a second facility that is independent of the first facility. The aircraft health data analyzer 120 sends supply requests to supplier devices associated with supplier locations of the components indicated in the repair parts list 457. For example, the aircraft health data analyzer 120 sends the supply request 443 to the supplier device 412 associated with the location 467.

The aircraft health data analyzer 120 generates a maintenance request 445. In a particular implementation, the aircraft health data analyzer 120 generates the maintenance request 445 in response to receiving the user input 147 indicating the selection of the requisition option of the GUI 141. In an alternate implementation, the aircraft health data analyzer 120 generates the maintenance request 445 independently of the user input 147. For example, the aircraft health data analyzer 120 generates the maintenance request 445 subsequent to determining the supplier locations of the components indicated in the repair parts list 457. The maintenance request 445 indicates the aircraft ID 151, the repair parts list 457, the supplier locations of the components indicated in the repair parts list 457, the repair location 471, the health data 131, or any combination thereof. For example, the maintenance request 445 indicates that maintenance of the aircraft 104 corresponding to the aircraft ID 151 is to be scheduled, that the components indicated in the repair parts list 457 are to be used in the maintenance, that the components are to be supplied to the repair location 471 from the corresponding supplier locations, that the health data 131 is to be analyzed to perform the maintenance, or any combination thereof. The aircraft health data analyzer 120 sends the maintenance request 445 to the maintenance device 414 associated with the repair location 471.

In a particular implementation, the aircraft health data analyzer 120 generates a message 461. The message 461 indicates that the aircraft 104 is being re-routed to the repair location 471. In a particular example, the aircraft health data analyzer 120 generates the message 461 in response to receiving the user input 147 indicating that the user 101 selected a message option of the GUI 141. In an alternate example, the aircraft health data analyzer 120 generates the message 461 independently of receiving the user input 147. To illustrate, the aircraft health data analyzer 120 generates the message 461 subsequent to determining the repair location 471. The transceiver 122 sends the message 461, e.g., via the satellite 112, to the aircraft 104.

The system 100 thus enables ordering components for repair of the aircraft 104, scheduling maintenance of the aircraft 104, re-routing the aircraft 104 to the repair location 471, or any combination thereof, in response to detecting the occurrence of one or more maintenance conditions in the aircraft 104 during flight. The aircraft parts that are probably the cause of the maintenance conditions, technicians that are qualified to repair the aircraft parts, items that are to be used to repair the aircraft parts, or any combination thereof, are requisitioned to repair the aircraft 104 prior to the aircraft 104 being inspected on the ground.

Figure 5:
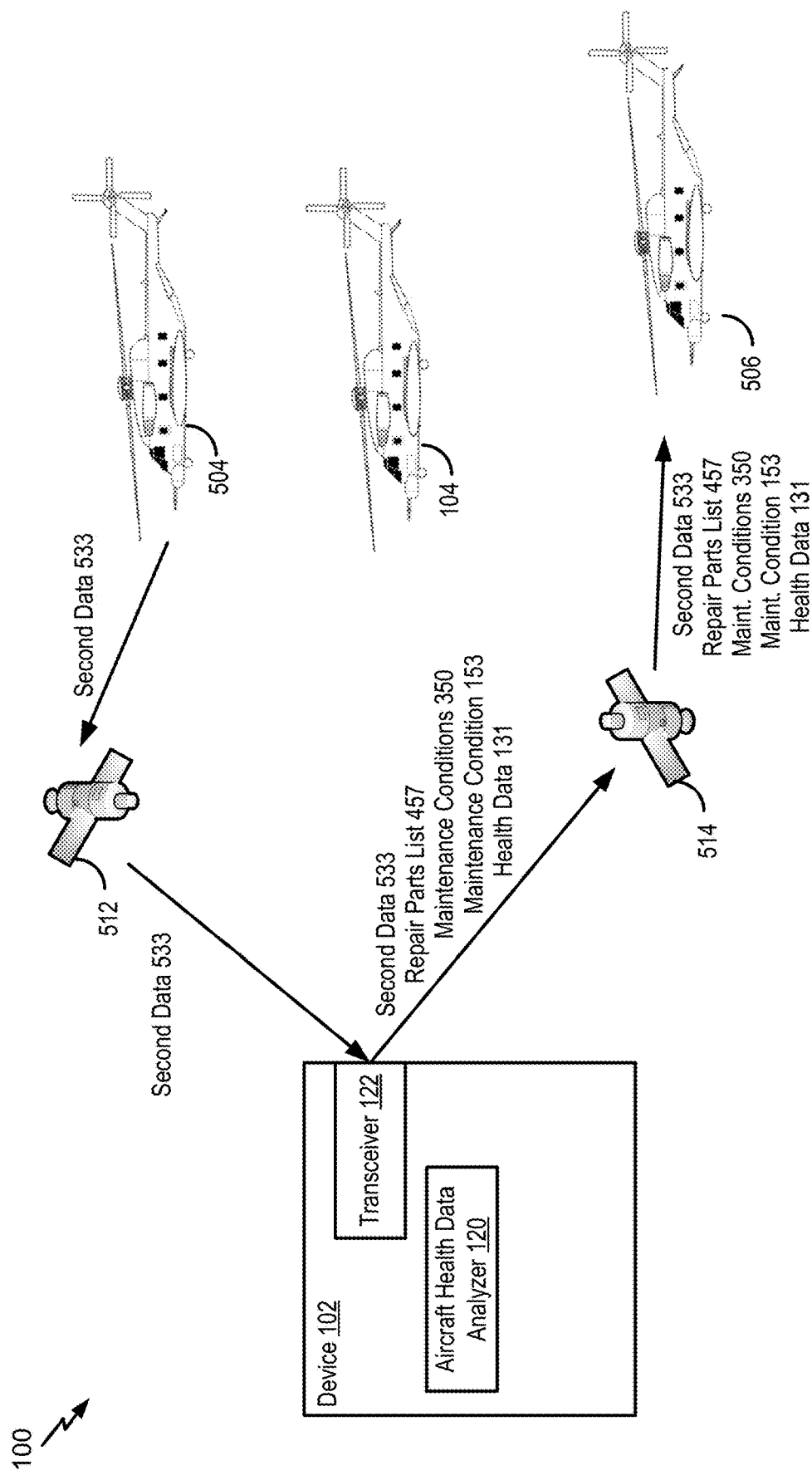
FIG. 5 is a diagram that illustrates examples of communications between an aircraft health data analyzer of the system of FIG. 1 and one or more aircraft.

FIG. 5 is a diagram of an illustrative aspect of the system 100. The system 100 includes an aircraft 504, an aircraft 506, a satellite 512, a satellite 514, or any combination thereof. The transceiver 122 is configured to communicate, via the satellite 512, with the aircraft 504. The transceiver 122 is configured to communicate, via the satellite 514, with the aircraft 506.

During operation, the aircraft 504 generates second data 533 indicating observations of the aircraft 104. In a particular example, the aircraft 504 includes a camera that captures an image of the aircraft 104. In another example, a person (e.g., a crew member or a passenger) aboard the aircraft 504 makes an observation of the aircraft 104. The second data 533 indicates the image, user input corresponding to the observation, or both. The aircraft 504, in response to determining that the satellite 512 is within communication range, sends the second data 533 via the satellite 512 to the device 102. In a particular implementation, the aircraft health data analyzer 120 sends a request to the aircraft 504 in response to determining that the aircraft 504 is within a threshold distance of the aircraft 104. In this implementation, the aircraft 504 sends the second data 533 to the device 102 in response to receiving the request.

The aircraft health data analyzer 120 determines the maintenance condition 153 based on the health data 131 of FIG. 1, the second data 533, or any combination thereof. For example, the aircraft health data analyzer 120 performs an analysis (e.g., image analysis or keyword analysis) of the second data 533 to determine the maintenance condition 153 (e.g., smoke near the fuselage of the aircraft 104). The aircraft health data analyzer 120 generates the first query 133 based on the maintenance condition 153, as described with reference to FIG. 1.

In a particular aspect, the aircraft health data analyzer 120 sends at least a portion of the second data 533, the health data 131, the repair parts list 457, the maintenance condition 153, the maintenance conditions 350, or any combination thereof, to the aircraft 506. For example, the aircraft health data analyzer 120, in response to determining that a destination of the aircraft 506 includes the repair location 471, that a technician requisitioned to replace an aircraft part of the aircraft 104 is aboard the aircraft 506, or both, sends at least a portion of the second data 533, the health data 131, the repair parts list 457, the maintenance condition 153, the maintenance conditions 350, or any combination thereof, to the aircraft 506. A technician aboard the aircraft 506 could review at least a portion of the second data 533, the health data 131, the repair parts list 457, the maintenance condition 153, the maintenance conditions 350, or any combination thereof, to prepare for repairing the aircraft 104. In a particular aspect, the aircraft 506 delivers a component to the repair location 471 in response to determining that the component is indicated in the repair parts list 457.

The system 100 thus enables use of observations from other aircraft in maintenance condition diagnosis. The system 100 also enables providing information to other aircraft to aid in repair of the aircraft 104.

Figure 6:
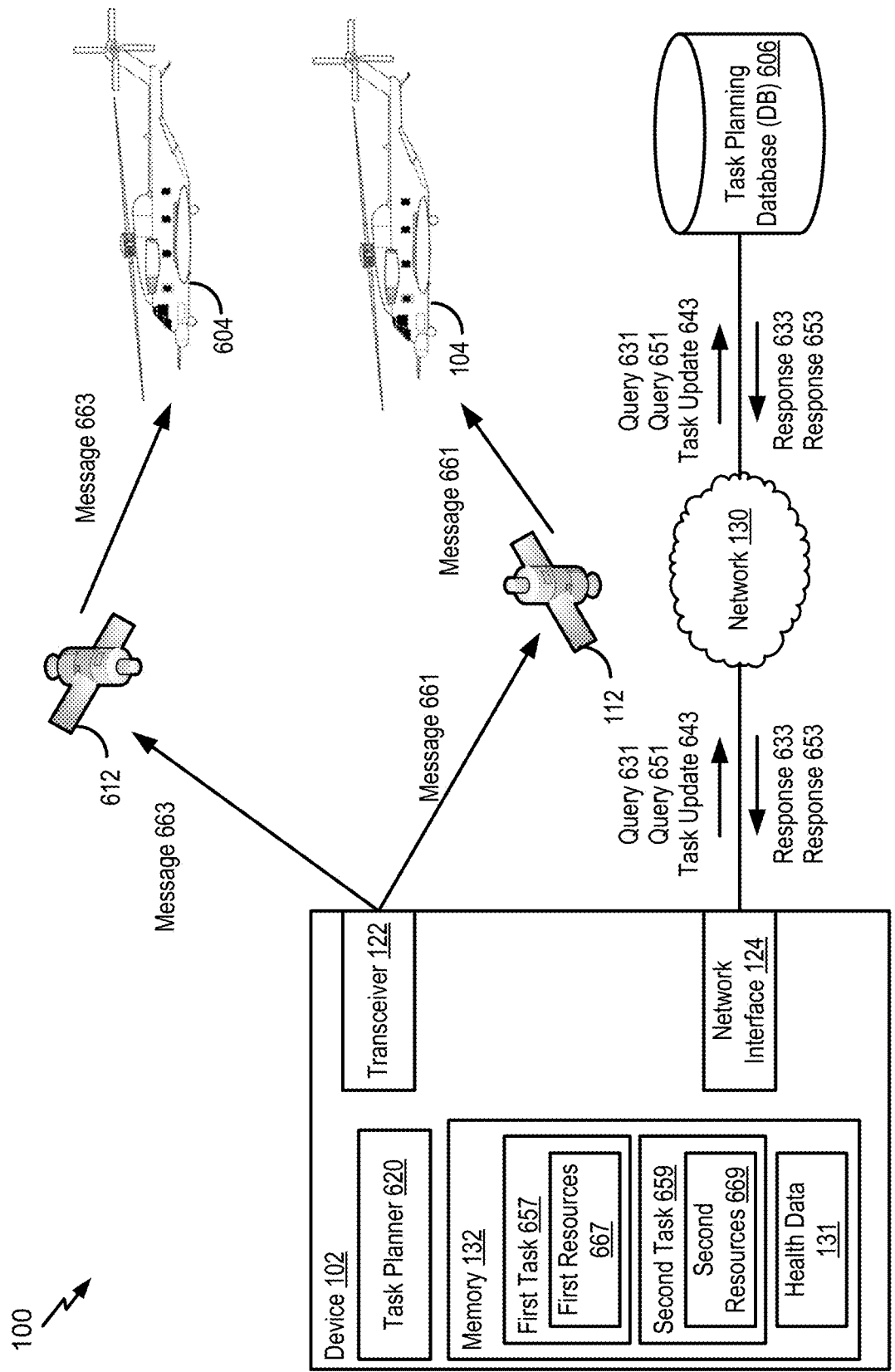
FIG. 6 is a diagram that illustrates an example of a task planner of the system of FIG. 1 that is operable to assign tasks to aircraft.

FIG. 6 is a diagram of an illustrative aspect of the system 100. The system 100 includes a satellite 612, an aircraft 604, a task planning database (DB) 606, or any combination thereof. The device 102 includes a task planner 620. The task planner 620 is configured to assign tasks to various aircraft. The transceiver 122 is configured to communicate, via the satellite 612, with the aircraft 604. The device 102 is configured to communicate with the task planning DB 606. In a particular aspect, the network interface 124 is configured to communicate, via the network 130, with the task planning DB 606. In a particular aspect, the device 102 is coupled to the task planning DB 606 independently of the network 130. For example, the task planning DB 606 is stored at the device 102. In a particular example, the task planning DB 606 is stored at a storage device and the device 102 is communicatively coupled to (e.g., includes) the storage device.

During operation, the task planner 620 is configured to determine whether the aircraft 104 is assigned to perform a task. For example, the task planner 620 is configured, in response to determining that at least one maintenance condition (e.g., the maintenance condition 153 of FIG. 1 or the maintenance conditions 350 of FIG. 3) of the aircraft 104 has been detected, to generate a query 631 indicating the aircraft ID 151 of the aircraft 104. The query 631 requests identification of a task, if any, assigned to the aircraft 104 and identification of aircraft resources to be used for performing the task. The aircraft health data analyzer 120 sends the query 631 to the task planning DB 606. For example, an interface (e.g., the network interface 124, an application interface, a database interface, or any combination thereof) sends the query 631 to the task planning DB 606.

The task planning DB 606 generates a response 633 in response to receiving the query 631. The response 633 indicates that the aircraft 104 is assigned to perform a first task 657 and that one or more first resources 667 are to be used to perform the first task 657. The task planning DB 606 receives the response 633 and determines whether the aircraft 104 is able to perform the first task 657. For example, the task planning DB 606 determines that the aircraft 104 is unable to perform the first task 657 in response to determining that the at least one maintenance condition (e.g., the maintenance condition 153 or the maintenance conditions 350) indicates that at least one of the first resources 667 is unavailable at the aircraft 104. In a particular implementation, the task planning DB 606 determines that the aircraft 104 is unable to perform the first task 657, in response to determining that the parts lists 155 of FIG. 1, the parts list 355, the parts list 357, the parts list 359 of FIG. 3, or any combination thereof, indicate at least one resource of the first resources 667, that the at least one resource is associated with a greater than threshold failure rate (as indicated by the failure rates 157 of FIG. 1, the failure rates 361, the failure rates 363, the failure rates 365 of FIG. 3, or any combination thereof), or both. The task planner 620 sends an update to the task planning DB 606 indicating that the at least one resource is unavailable at the aircraft 104.

The task planner 620, in response to determining that the aircraft 104 is unable to perform the first task 657, determines whether another aircraft is able to perform the first task 657. For example, the task planner 620 generates a query 651 indicating the first task 657, the first resources 667, or any combination thereof. The task planner 620 sends the query 651 to the task planning DB 606. The task planning DB 606, in response to receiving the query 651, determines whether the first resources 667 of the first task 657 are available at another aircraft. For example, the task planning DB 606 determines that the first resources 667 are available at the aircraft 604. The task planning DB 606 generates a response 653 indicating that the first resources 667 are available at the aircraft 604 and sends the response 653 to the task planner 620.

The task planner 620, in response to determining that the first resources 667 are available at the aircraft 604, determines whether another task is assigned to the aircraft 604. For example, the task planner 620 sends the query 651 to the task planning DB 606 indicating the aircraft 604 and receives the response 653 from the task planning DB 606. In a particular example, the task planner 620, in response to determining that the response 653 indicates that the aircraft 604 is not assigned to perform another task, determines that the aircraft 604 is available to be assigned the first task 657. In an alternative example, the task planner 620, in response to determining that the response 653 indicates that the aircraft 604 assigned to perform a second task 659, determines whether the aircraft 104 is able to perform the second task 659. To illustrate, the response 653 indicates that one or more second resources 669 are to be used to perform the second task 659. The task planner 620 determines whether the second resources 669 are available at the aircraft 104. For example, the task planner 620 sends the query 651 to the task planning DB 606 and receives the response 653. The response 653 indicates one or more resources that are available at the aircraft 104. The task planner 620 determines whether the aircraft 104 is able to perform the second task 659. For example, the task planner 620 determines that the aircraft 104 is able to perform the second task 659 in response to determining that the one or more resources include each of the second resources 669.

In a particular implementation, the task planner 620 generates the GUI 141 of FIG. 1 indicating that the aircraft 104 is unable to perform the first task 657. In a particular implementation, the task planner 620, in response to determining that the aircraft 604 is available to perform the first task 657, generates the GUI 141 including a task reassignment option to reassign the first task 657 to the aircraft 604. In this implementation, the task planner 620, in response to receiving the user input 147 indicating a user selection of the task reassignment option, generates a task update 643 indicating that the first task 657 is reassigned from the aircraft 104 to the aircraft 604. In an alternate implementation, the task planner 620 generates the task update 643 independently of the user input 147. For example, the task planner 620 generates the task update 643 in response to determining that the aircraft 604 is available to perform the first task 657. The aircraft health data analyzer 120 sends the task update 643 to the task planning DB 606. For example, an interface (e.g., the network interface 124, an application interface, a database interface, or any combination thereof) sends the task update 643 to the task planning DB 606. The task planning DB 606 updates records to indicate that the first task 657 is no longer assigned to the aircraft 104 and is assigned to the aircraft 604. The task planner 620 initiates sending of a message 663, via the satellite 612, to the aircraft 604. The message 663 indicates that the first task 657 is assigned to the aircraft 604. The task planner 620 initiates sending of a message 661, via the satellite 112, to the aircraft 104 indicating that the first task 657 is no longer assigned to the aircraft 104.

In a particular implementation, the task planner 620, in response to determining that the aircraft 604 is assigned to perform the second task 659 and that the aircraft 104 is able to perform the second task 659, generates the GUI 141 including a task reassignment option to reassign the first task 657 to the aircraft 604 and the second task 659 to the aircraft 104. In this implementation, the task planner 620, in response to receiving the user input 147 indicating a user selection of the task reassignment option, generates the task update 643 indicating that the first task 657 is reassigned from the aircraft 104 to the aircraft 604 and that the second task 659 is reassigned from the aircraft 604 to the aircraft 104. In an alternate implementation, the task planner 620 generates the task update 643 independently of the user input 147. For example, the task planner 620 generates the task update 643 in response to determining that the aircraft 604 is available to perform the first task 657 and that the aircraft 104 is able to perform the second task 659.

The aircraft health data analyzer 120 sends the task update 643 to the task planning DB 606. For example, an interface (e.g., the network interface 124, an application interface, a database interface, or any combination thereof) sends the task update 643 to the task planning DB 606. The task planning DB 606 updates records to indicate that the first task 657 is assigned to the aircraft 604 and that the second task 659 is assigned to the aircraft 104. The task planner 620 initiates sending of the message 663, via the satellite 612, to the aircraft 604 indicating that the second task 659 is no longer assigned to the aircraft 604 and that the first task 657 is assigned to the aircraft 604. The task planner 620 initiates sending of the message 661, via the satellite 112, to the aircraft 104 indicating that the first task 657 is no longer assigned to the aircraft 104 and that the second task 659 is assigned to the aircraft 104.

The system 100 thus enables reassignment of tasks to aircraft based on available resources. For example, the first task 657 is reassigned from the aircraft 104 to the aircraft 604 based at least in part on determining that the aircraft 104 is unable to perform the first task 657.

Figure 7:
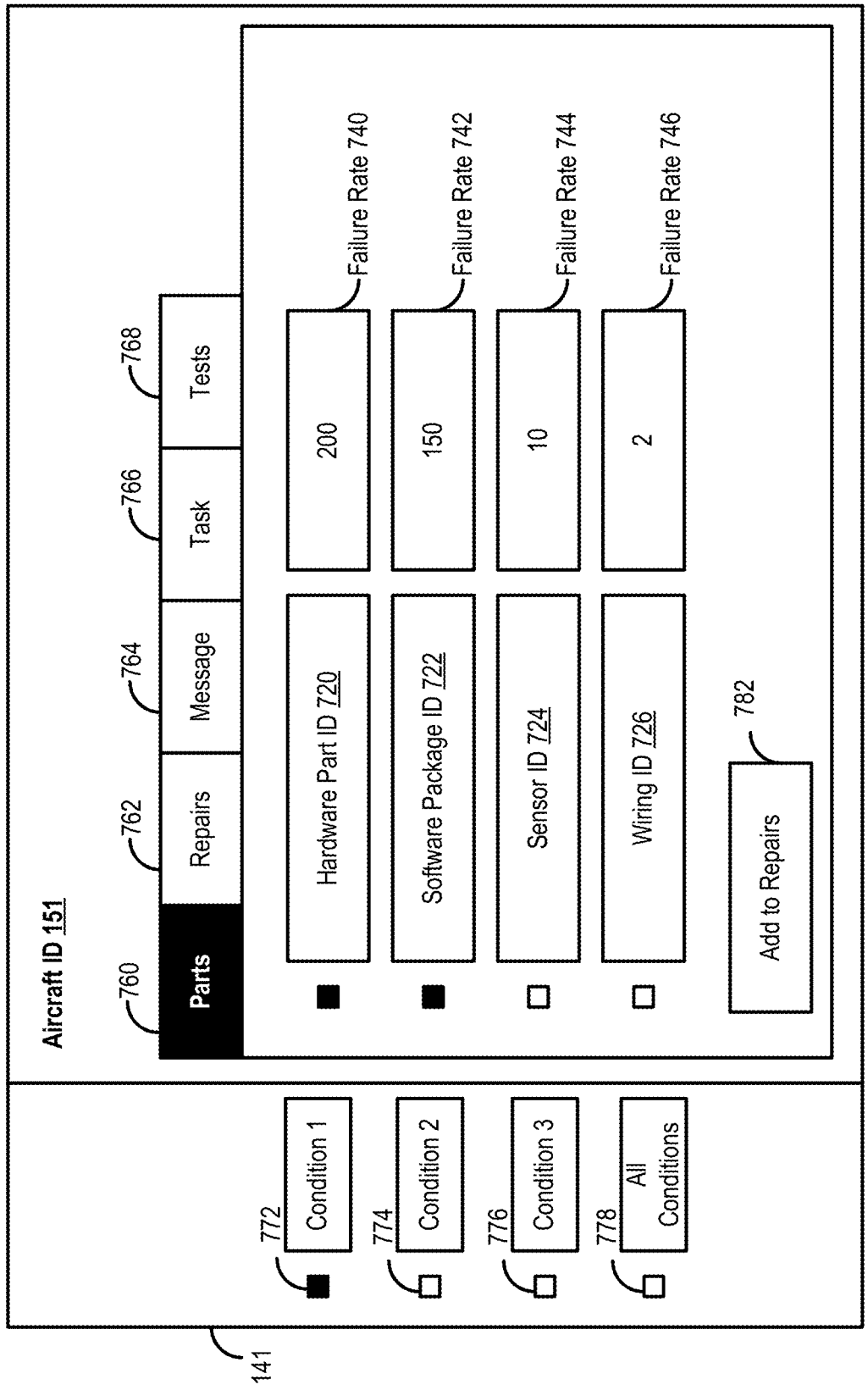
FIG. 7 is a diagram that illustrates an example of a graphical user interface (GUI) generated by the system of FIG. 1.

FIG. 7 is a diagram of an illustrative aspect of the GUI 141. The GUI 141 indicates the aircraft ID 151 of the aircraft 104 of FIG. 1. The GUI 141 includes one or more menu options. For example, the GUI 141 includes a parts option 760, a repairs option 762, a message option 764, a task option 766, a tests option 768, one or more additional options, or any combination thereof.

The GUI 141 indicates, in response to a selection of the parts option 760, one or more options to select one or more maintenance conditions. For example, the GUI 141 indicates a condition option 772 corresponding to the maintenance condition 153 of FIG. 1, a condition option 774 corresponding to the maintenance condition 353 of FIG. 3, a condition option 776 corresponding to a third maintenance condition of the maintenance conditions 350 of FIG. 3, and a condition option 778 corresponding to the maintenance conditions 350.

The GUI 141 indicates, in response to a selection of the condition option 772, the parts list 155 of FIG. 1 ordered based on the failure rates 157 of FIG. 1. For example, the parts list 155 includes a hardware part ID 720 of a hardware part (e.g., a particular fuel tank), a software package ID 722 of a particular software package, a sensor ID 724 of a particular sensor (e.g., a particular temperature sensor), a wiring ID 726 for particular wiring, or any combination thereof. The failure rates 157 include a failure rate 740 (e.g., 200) of the hardware part, a failure rate 742 (e.g., 150) of the particular software package, a failure rate 744 (e.g., 10) of the particular sensor, a failure rate 746 (e.g., 2) of the particular wiring, or any combination thereof. In this example, the GUI 141 indicates the hardware part ID 720, the software package ID 722, the sensor ID 724, and the wiring ID 726 in order (e.g., an ascending order or a descending order) of the failure rate 740, the failure rate 742, the failure rate 744, and the failure rate 746. It should be understood that the hardware part, the particular software package, the particular sensor, and the particular wiring are described as illustrative examples. In other examples, the GUI 141 indicates one or more other types of aircraft parts, multiple aircraft parts of the same type, or any combination thereof.

The GUI 141 indicates, in response to a selection of the condition option 774, the parts list 355 of FIG. 3 that is ordered based on the failure rates 361 of FIG. 3. In a particular implementation, the GUI 141 indicates, in response to a selection of the condition option 772 and the condition option 774 (e.g., the condition option 772 is selected and the condition option 774 is selected), the parts list 357 of FIG. 3 that is ordered based on the failure rates 363. In an alternative implementation, the GUI 141 indicates, in response to a selection of the condition option 772 and the condition option 774, the parts list 359 of FIG. 3 that is ordered based on the failure rates 365. The GUI 141 indicates, in response to a selection of the condition option 776, a third parts list that is ordered based on third failure rates of aircraft parts associated with the third maintenance condition. The GUI 141 indicates, in response to a selection of the condition option 778, a parts list that is ordered based on failure rates of aircraft parts associated with any of the maintenance conditions 350 of FIG. 3. For example, the GUI 141 indicates, in response to the selection of the condition option 778, aircraft parts that are indicated in any of the parts list 155, the parts list 355, or the third parts list. The GUI 141 displays the aircraft parts based on corresponding failure rates indicated by the failure rates 157, the failure rates 361, the third failure rates, or any combination thereof.

The GUI 141 includes an add to repairs option 782. In a particular implementation, the aircraft health data analyzer 120 of FIG. 1, in response to receiving a selection of the add to repairs option 782, adds one or more selected aircraft part identifiers to the repair parts list 457 of FIG. 4. In a particular example, the user 101 of FIG. 1 selects a first option corresponding to the hardware part ID 720 of the hardware part (e.g., the particular fuel tank), a second option corresponding to the software package ID 722 of the particular software package, and the add to repairs option 782. In this example, the aircraft health data analyzer 120, in response to receiving the user input 147 of FIG. 1 indicating a user selection of the first option, the second option, and the add to repairs option 782, adds the hardware part ID 720 and the software package ID 722 to the repairs parts list 457.

In a particular implementation, the GUI 141, in response to receiving a selection of the repairs option 762, indicates components from the repairs parts list 457. For example, the GUI 141, in response to receiving the selection of the repairs option 762, indicates the hardware part ID 720, the software package ID 722, a first technician qualified to replace the hardware part corresponding to the hardware part ID 720, a second technician qualified to replace (or install) the software package corresponding to the software package ID, one or more items to be used to replace the hardware part, one or more items to be used to replace (or install) the software package, or any combination thereof. The GUI 141 could include an option to designate the repair location 471 of FIG. 4 at which the aircraft 104 is to be repaired, as described with reference to FIG. 4. The GUI 141 could indicate one or more locations at which each of the components is available. In a particular example, the GUI 141 indicates that hardware part corresponding to the hardware part ID 720 is available at a first location, a second location, or a third location and that the software package corresponding to the software package ID 722 is available at a fourth location and a third location. In a particular example, the GUI 141 indicates that an aircraft part corresponding to the part ID 459 of FIG. 4 is available at locations indicated by the locations list 465 of FIG. 4.

In a particular implementation, the GUI 141 includes options to select locations from which the components are to be supplied for repairing the aircraft 104. In a particular example, the GUI 141 includes a first option to select the first location, a second option to select the second location, and a third option to select the third location from which the hardware part is to be supplied to the repair location 471. The GUI 141 includes a fourth option to select the fourth location and a fifth option to select the fifth location from which the software package is to be supplied to the repair location 471. In a particular example, the GUI 141 includes options to select one of the locations indicated by the locations list 465 from which the part ID 459 is to be supplied to the repair location 471. In this implementation, the aircraft health data analyzer 120, in response to receiving the user input 147 indicating a selection of a location associated with a component, assigns the location as a supplier location from which the component is to be supplied to the repair location 471. For example, the aircraft health data analyzer 120 designates the location 467 of FIG. 4 as a supplier location of the part ID 459, as described with reference to FIG. 4.

In a particular implementation, the GUI 141 includes a requisition option. The aircraft health data analyzer 120, in response to receiving the user input 147 indicating a user selection of the requisition option, initiates sending of supply requests to supplier devices to supply components indicated by the repair parts list 457 to the repair location 471. For example, the aircraft health data analyzer 120, in response to receiving the user input 147 indicating a user selection of the requisition option, initiates sending of the supply request 443 to the supplier device 412, as described with reference to FIG. 4. The aircraft health data analyzer 120, in response to receiving the user input 147 indicating the user selection of the requisition option, initiates sending of the maintenance request 445 to the maintenance device 414, as described with reference to FIG. 4.

In a particular implementation, the GUI 141, in response to receiving a selection of the message option 764, indicates a message field and a send option to send a message to crew (e.g., a pilot) of the aircraft 104. The aircraft health data analyzer 120, in response to receiving a selection of the send option, sends the message 161 to the aircraft 104, as described with reference to FIG. 1.

In a particular implementation, the GUI 141, in response to receiving a selection of the task option 766, indicates whether a task is assigned to the aircraft 104. For example, the task planner 620 of FIG. 6, in response to determining that the first task 657 of FIG. 6 is assigned to the aircraft 104, generates the GUI 141 to indicate that the first task 657 is assigned to the aircraft 104. In a particular example, the task planner 620, in response to determining that the aircraft 104 is unable to perform the first task 657, generates the GUI 141 to indicate that the aircraft 104 is unable to perform the first task 657, to include a task removal option to have the first task 657 no longer be assigned to the aircraft 104, or both. For example, the task planner 620, in response to receiving a selection of the task removal option, sends the task update 643 to the task planning DB 606 indicating that the first task 657 is unassigned, no longer assigned to aircraft 104, or both.

In a particular example, the task planner 620, in response to determining that the aircraft 104 is unable to perform the first task 657 and that the aircraft 604 is available to perform the first task 657, generates the GUI 141 to include a first task reassignment option. The task planner 620, in response to receiving a selection of the first task reassignment option, is configured to reassign the first task 657 from the aircraft 104 to the aircraft 604, as described with reference to FIG. 6.

In a particular example, the task planner 620, in response to determining that the aircraft 104 is unable to perform the first task 657, that the aircraft 604 is able to perform the first task 657, that the aircraft 604 is assigned to perform the second task 659 of FIG. 6, and that the aircraft 104 is able to perform the second task 659, generates the GUI 141 to include a second task reassignment option. The task planner 620, in response to receiving a selection of the second task reassignment option, is configured to reassign the first task 657 from the aircraft 104 to the aircraft 604 and to reassign the second task 659 from the aircraft 604 to the aircraft 104, as described with reference to FIG. 6.

In a particular implementation, the GUI 141, in response to receiving a selection of the tests option 768, indicates the health data 131. For example, the GUI 141 indicates results of one or more tests performed at the aircraft 104. In a particular example, the GUI 141 includes a test option to select one or more tests to be performed at the aircraft 104. The aircraft health data analyzer 120, in response to receiving a selection of the test option, sends the request 271 of FIG. 2 to the aircraft 104. The request 271 indicates that the one or more selected tests are to be performed at the aircraft 104. The aircraft 104 sends the health data 131 in response to receiving the request 271, as described with reference to FIG. 2. The health data 131 indicates the results of performing the selected tests. The aircraft health data analyzer 120, in response to receiving the health data 131, updates the GUI 141 to indicate the results of performing the selected tests.

The GUI 141 thus enables the user 101 to perform maintenance of aircraft. For example, the GUI 141 enables the user 101 to determine which aircraft parts are relatively more likely to be the cause of a particular maintenance condition, to select particular aircraft parts to be repaired, to select a repair location for the aircraft 104, to select locations from which the selected aircraft parts, technicians qualified to replace the aircraft, and items to be used to repair the aircraft parts are to be supplied to the repair location, to submit a requisition order, to send a message to a pilot, to reassign a task that the aircraft 104 is unable to perform, to request particular tests to be performed at the aircraft 104, to view results of the tests, or any combination thereof.

Figure 8:
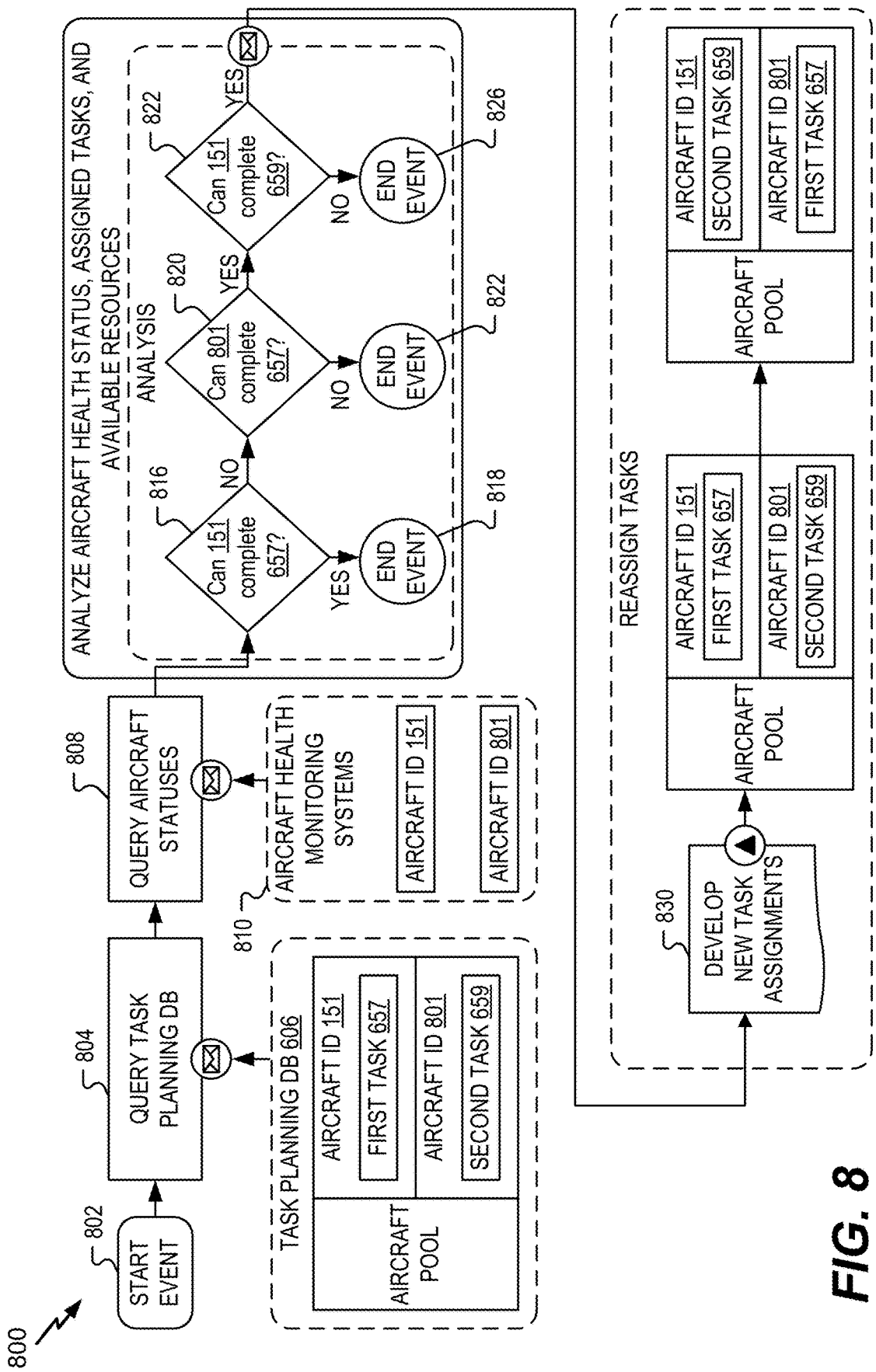
FIG. 8 is a diagram that illustrates operation of the system of FIG. 1.

Referring to FIG. 8, a diagram is shown and generally designated 800. The diagram 800 illustrates an example of operation of the system 100 of FIG. 1.

The diagram 800 includes a start event, at 802. For example, the task planner 620 of FIG. 6 detects a start event, such as receiving the user input 147, expiration of a timer, determining that at least one maintenance condition is detected at the aircraft 104, or any combination thereof.

The diagram 800 includes querying a task planning database, at 804. For example, the task planner 620 of FIG. 6 sends the query 631 to the task planning DB 606, as described with reference to FIG. 6. The task planner 620 receives the response 633 from the task planning DB 606. The response 633 is responsive to the query 631. The response 633 indicates tasks assigned to various aircraft. For example, the response 633 indicates that the first task 657 is assigned to the aircraft 104 and that the second task 659 is assigned to the aircraft 604.

The diagram 800 includes querying aircraft statuses, at 808. For example, the task planner 620 of FIG. 6 queries aircraft health monitoring systems 810. The aircraft health monitoring systems 810 include the task planning DB 606, the aircraft health data analyzer 120, or both. For example, the task planner 620 sends the query 651 to the task planning DB 606 to determine the resources available at various aircraft. The task planner 620 receives the response 653 from the task planning DB 606. The response 653 indicates that one or more first particular resources are available at the aircraft 104 having the aircraft ID 151 and that one or more second particular resources are available at the aircraft 604 having an aircraft ID 801. As another example, the task planner 620 sends a request to the aircraft health data analyzer 120 and determines the resources available at various aircraft based on a response to the request. For example, the aircraft health data analyzer 120 provides the health data 131, the parts list 155, the parts lists 360, or any combination thereof, of the aircraft 104 to the task planner 620. The task planner 620 determines, based on the health data 131, the parts list 155, the parts lists 360, or any combination thereof, that the first particular resources are available at the aircraft 104. For example, the task planner 620 determines that the aircraft 104 includes a plurality of resources by sending a query to the task planning DB 606 and receiving a response from the task planning DB 606 indicating the plurality of resources. The task planner 620 determines that the first particular resources correspond to resources that are included in the plurality of resources and are excluded from the parts list 155.

The diagram 800 includes determining whether the aircraft 104 corresponding to the aircraft ID 151 complete the first task 657, at 816. For example, the task planner 620 determines whether the aircraft 104 is able to perform the first task 657, as described with reference to FIG. 6. The diagram 800 includes an end event, at 818. For example, the task planner 620 detects an end event in response to determining that the aircraft 104 is able to perform the first task 657. An end event indicates an end to an analysis being performed.

The diagram 800 includes determining whether the aircraft 604 corresponding to the aircraft ID 801 can complete the first task 657, at 820. For example, the task planner 620, in response to determining that the aircraft 104 is unable to perform the first task 657, determines whether the aircraft 604 is able to perform the first task 657, as described with reference to FIG. 6. The diagram 800 includes an end event, at 822. For example, the task planner 620 detects an end event in response to determining that the aircraft 604 is unable to perform the first task 657.

The diagram 800 includes determining whether the aircraft 104 corresponding to the aircraft ID 151 can complete the second task 659, at 822. For example, the task planner 620, in response to determining that the aircraft 604 is able to perform the first task 657, determines whether the aircraft 104 is able to perform the second task 659, as described with reference to FIG. 6. The diagram 800 includes an end event, at 826. For example, the task planner 620 detects an end event in response to determining that the aircraft 104 is unable to perform the second task 659.

The diagram 800 includes developing new task assignments, at 830. For example, the task planner 620, in response to determining that the aircraft 104 is able to perform the second task 659, reassigns the first task 657 from the aircraft 104 to the aircraft 604 and reassigns the second task 659 from the aircraft 604 to the aircraft 104, as described with reference to FIG. 6.

The diagram 800 thus illustrates an example of operation of the system 100 to reassign tasks to aircraft based on available resources. For example, the first task 657 is reassigned from the aircraft 104 to the aircraft 604 based at least in part on determining that the aircraft 104 is unable to perform the first task 657.

Figure 9:
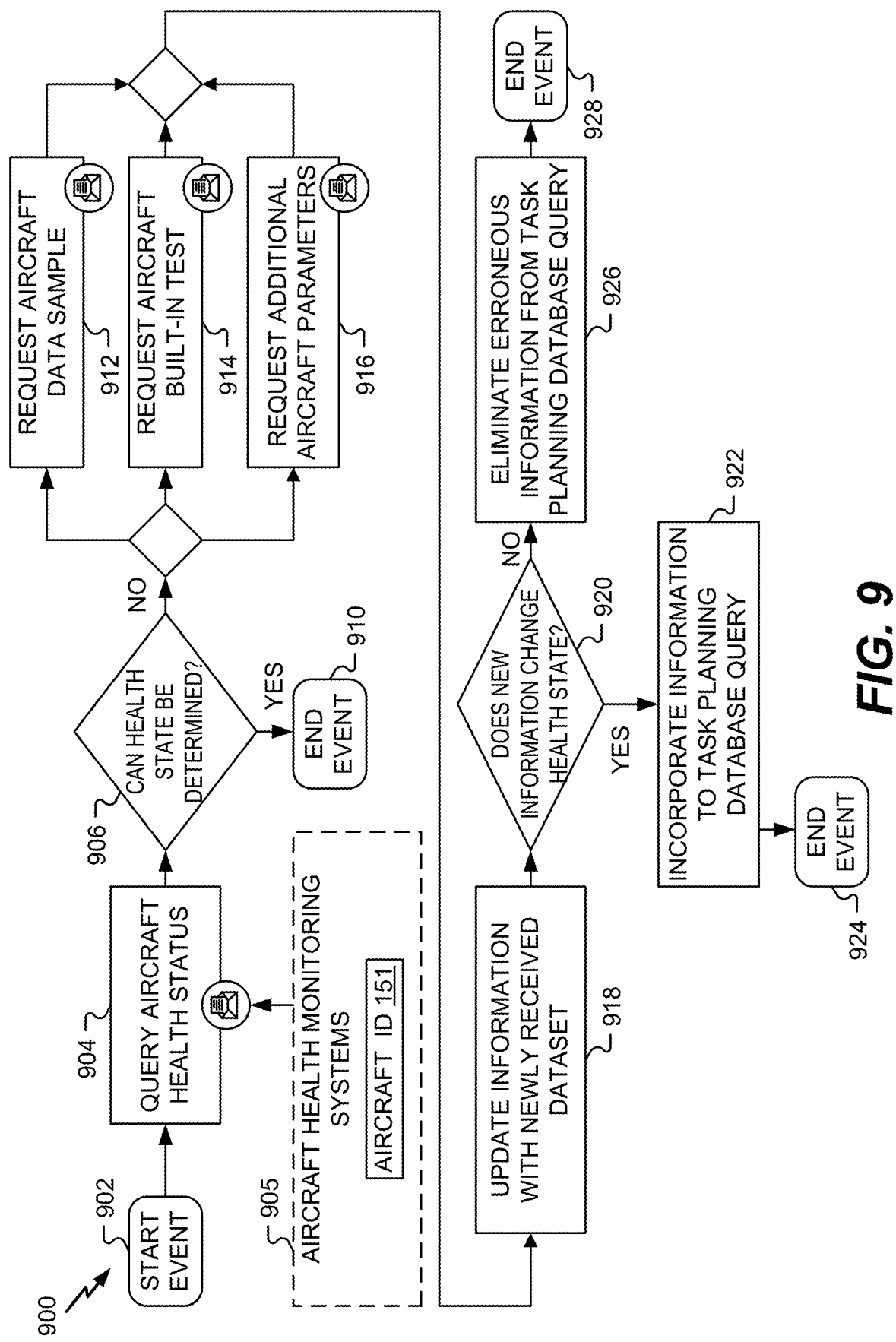
FIG. 9 is a diagram that illustrates operation of the system of FIG. 1.

Referring to FIG. 9, a diagram is shown and generally designated 900. The diagram 900 illustrates an example of operation of the system 100 of FIG. 1.

The diagram 900 includes a start event, at 902. For example, the aircraft health data analyzer 120 of FIG. 1 detects a start event, such as receiving the user input 147, expiration of a timer, or any combination thereof.

The diagram 900 includes querying aircraft health status, at 904. For example, the aircraft health data analyzer 120 of FIG. 1 queries aircraft health monitoring systems 905. The aircraft health monitoring systems 905 include the aircraft 104, the memory 132, or both. For example, the aircraft health data analyzer 120 sends a request to the aircraft 104 and receives the health data 243 of FIG. 2 responsive to the request. As another example, the aircraft health data analyzer 120 retrieves the health data 243 from the memory 132.

The diagram 900 includes determining whether a health state of an aircraft can be determined, at 906. For example, the aircraft health data analyzer 120 of FIG. 1 determines whether a health state of the aircraft 104 can be determined based on the health data 243. To illustrate, the aircraft health data analyzer 120 determines that the health data 243 includes results of a first test, first values of sensor data sampled at a first data sampling frequency, a first value of a first parameter, or any combination thereof, and indicates that the maintenance condition 253 is detected at the aircraft 104. The aircraft health data analyzer 120 determines, based on the additional information data 255 of FIG. 2, whether additional information is to be requested from the aircraft 104 to determine the health state of the aircraft 104 in response to determining that the maintenance condition 253 is detected based on the first test, the first data sampling frequency, the first parameter, or any combination thereof.

The diagram 900 includes an end event, at 910. For example, the aircraft health data analyzer 120 of FIG. 1 detects an end event in response to determining that the health state of the aircraft 104 can be determined based on the health data 243. To illustrate, the aircraft health data analyzer 120 determines that the additional information data 255 indicates that, in response to determining that the maintenance condition 253 is detected based on the first test, the first data sampling frequency, the first parameter, or any combination thereof, additional information is not to be requested from the aircraft 104 to determine the health state of the aircraft. The aircraft health data analyzer 120 determines that the health state of the aircraft corresponds to the maintenance condition 253.

The diagram 900 includes requesting aircraft data sample, at 912. For example, the aircraft health data analyzer 120 of FIG. 1 determines that sensor data corresponding to a second data sampling frequency is to be requested from the aircraft 104 to determine the health state of the aircraft 104. To illustrate, the aircraft health data analyzer 120 determines that the additional information data 255 indicates that, in response to determining that the maintenance condition 253 is detected based on the first test, the first data sampling frequency, the first parameter, or any combination thereof, sensor data corresponding to the second data sampling frequency is to be requested from the aircraft 104. The aircraft health data analyzer 120 sends the request 271 to the aircraft 104 indicating the second data sampling frequency.

The diagram 900 includes requesting an aircraft built-in test, at 914. For example, the aircraft health data analyzer 120 of FIG. 1 determines that results of a second test are to be requested from the aircraft 104 to determine the health state of the aircraft 104. To illustrate, the aircraft health data analyzer 120 determines that the additional information data 255 indicates that, in response to determining that the maintenance condition 253 is detected based on the first test, the first data sampling frequency, the first parameter, or any combination thereof, results of performing the second test are to be requested from the aircraft 104. The aircraft health data analyzer 120 sends the request 271 to the aircraft 104 indicating the second test.

The diagram 900 includes requesting additional aircraft parameters, at 916. For example, the aircraft health data analyzer 120 of FIG. 1 determines that a second parameter is to be requested from the aircraft 104 to determine the health state of the aircraft 104. To illustrate, the aircraft health data analyzer 120 determines that the additional information data 255 indicates that, in response to determining that the maintenance condition 253 is detected based on the first test, the first data sampling frequency, the first parameter, or any combination thereof, a second value of the second parameter is to be requested from the aircraft 104. The aircraft health data analyzer 120 sends the request 271 to the aircraft 104 indicating the second parameter.

The diagram 900 includes updating information with newly received dataset, at 918. For example, the aircraft health data analyzer 120 of FIG. 1 receives the health data 131 responsive to the request 271. The aircraft health data analyzer 120 stores the health data 131 in the memory 132.

The diagram 900 includes determining whether the new information change health state, at 920. For example, the aircraft health data analyzer 120 of FIG. 1 determines that the health data 131 indicates the maintenance condition 153. The aircraft health data analyzer 120 determines whether the maintenance condition 153 is the same as the maintenance condition 253.

The diagram 900 includes incorporating information to task planning database query, at 922. For example, the aircraft health data analyzer 120, in response to determining that the maintenance condition 153 is distinct from the maintenance condition 253, provides the health data 131, the maintenance condition 153, the parts list 155, or any combination thereof, to the task planner 620. The task planner 620 determines task assignments (e.g., reassignments) based on the health data 131, the maintenance condition 153, the parts list 155, or any combination thereof, as described with reference to FIG. 6. In a particular aspect, the task planner 620 determines the task assignments (e.g., reassignments) in response to determining that a change in state of the aircraft 104 is indicated by the health data 131, the maintenance condition 153, the parts list 155, or any combination thereof. For example, the task planner 620 determines the task assignments (e.g., reassignments) in response to determining, based on the health data 131, the maintenance condition 153, the parts list 155, or any combination thereof, that a first part that was previously available (e.g., at an assignment time of the first task 657) at the aircraft 104 is no longer available at the aircraft 104, that a second part that was previously unavailable (e.g., at the assignment time) at the aircraft 104 is available at the aircraft 104, or both. The diagram 900 includes an end event, at 924. The aircraft health data analyzer 120 detects an end event subsequent to providing the health data 131, the maintenance condition 153, the parts list 155, or any combination thereof, to the task planner 620.

The diagram 900 includes eliminating erroneous information from task planning database query, at 926. For example, the aircraft health data analyzer 120, in response to determining that the maintenance condition 153 is the same as the maintenance condition 253, provides the health data 131, the maintenance condition 153, the parts list 155, or any combination thereof, to the task planner 620. The task planner 620 determines task assignments (e.g., reassignments) based on the health data 131, the maintenance condition 153, the parts list 155, or any combination thereof, as described with reference to FIG. 6. In a particular aspect, the task planner 620 refrains from determining the task assignments (e.g., reassignments) in response to determining that the health data 131, the maintenance condition 153, the parts list 155, or any combination thereof, indicate an unchanged state of the aircraft 104. For example, the task planner 620 refrains from generating the task assignments (e.g., reassignments) in response to determining, based on the health data 131, the maintenance condition 153, the parts list 155, or any combination thereof, that there is no change in availability of parts as compared to a previous availability of parts (e.g., at an assignment time of the first task 657) at the aircraft 104. The diagram 900 includes an end event, at 928. The aircraft health data analyzer 120 detects an end event subsequent to providing the health data 131, the maintenance condition 153, the parts list 155, or any combination thereof, to the task planner 620.

The diagram 900 thus illustrates an example of operation of the system 100 to selectively request additional information to determine a health state of the aircraft 104. For example, additional information is requested based on the additional information data 255, the maintenance condition 253, or any combination thereof.

Figure 10:
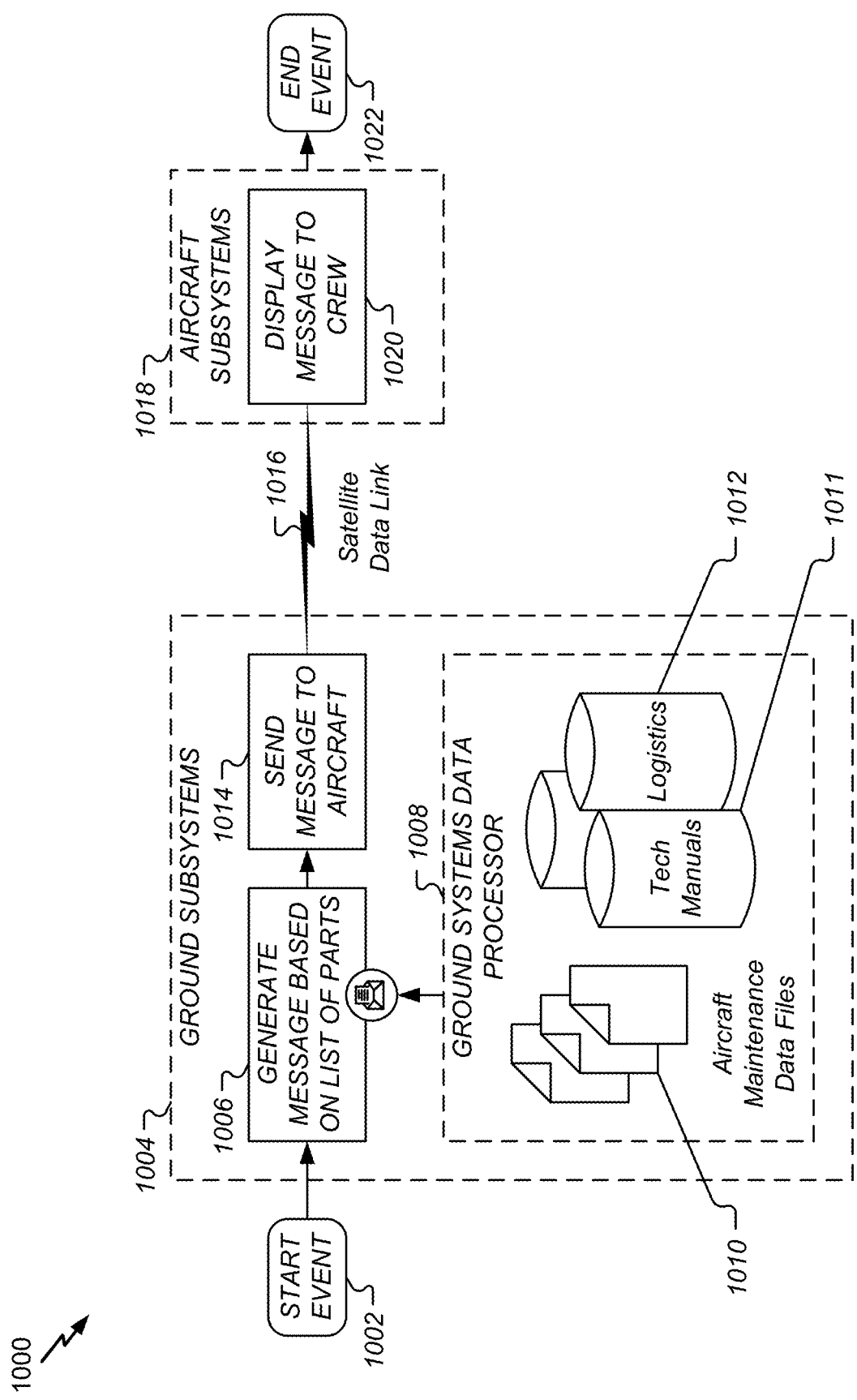
FIG. 10 is a diagram that illustrates operation of the system of FIG. 1.

Referring to FIG. 10, a diagram is shown and generally designated 1000. The diagram 1000 illustrates an example of operation of the system 100 of FIG. 1.

The diagram 1000 includes a start event, at 1002. For example, the aircraft health data analyzer 120 detects a start event, such as receiving the user input 147, expiration of a timer, determining that at least one maintenance condition is detected at the aircraft 104, or any combination thereof.

The diagram 1000 includes generating, at ground subsystems 1004, a message based on a list of parts, at 1006. For example, the ground subsystems 1004 receive the list of parts from a ground systems data processor 1008. The ground subsystems 1004 include the aircraft health data analyzer 120, the device 102 of FIG. 1, or both. The ground systems data processor 1008 includes aircraft maintenance data files 1010, technical manuals 1011, logistics data 1012, or any combination thereof. The ground systems data processor 1008 corresponds to the maintenance database 106, the historical maintenance database 108, the logistics database 406, or any combination thereof. In a particular example, the historical maintenance database 108 stores the aircraft maintenance data files 1010, the maintenance database 106 stores the technical manuals 1011, the logistics database 406 stores the logistics data 1012, or any combination thereof. The aircraft health data analyzer 120 determines the parts list 155 based on information received from the ground subsystems 1004. For example, the aircraft health data analyzer 120 receives the first response 135 from the maintenance database 106, as described with reference to FIG. 1. The first response 135 includes the parts list 155. The aircraft health data analyzer 120 generates the message 161 of FIG. 1 based on the parts list 155. For example, the message 161 indicates the parts list 155.

The diagram 1000 includes sending the message to an aircraft, at 1014. The message is sent from the ground subsystems 1004, via a satellite data link 1016, to aircraft subsystems 1018. For example, the aircraft health data analyzer 120 initiates sending of the message 161 to the aircraft 104. The message 161 is sent from the transceiver 122, via the satellite 112, to the aircraft 104.

The diagram 1000 includes displaying the message to crew, at 1020. For example, a processor at the aircraft 104 generates a GUI based on the message 161 and provides the GUI to a display of the aircraft 104. To illustrate, the display is included in, or coupled to, an instrument panel in a cockpit of the aircraft 104.

The diagram 1000 includes an end event, at 1022. For example, the aircraft health data analyzer 120 detects an end event subsequent to transmission of the message 161 to the aircraft 104.

The diagram 1000 thus illustrates an example of operation of the system 100 to identify a list of parts based on aircraft maintenance files, technical manuals, logistics data, or any combination thereof, to send a message to the aircraft 104 indicating the list of parts, and to display the message to the crew of the aircraft 104. The crew may thus be informed of parts that are likely the cause of a maintenance condition detected at the aircraft 104.

Figure 11:
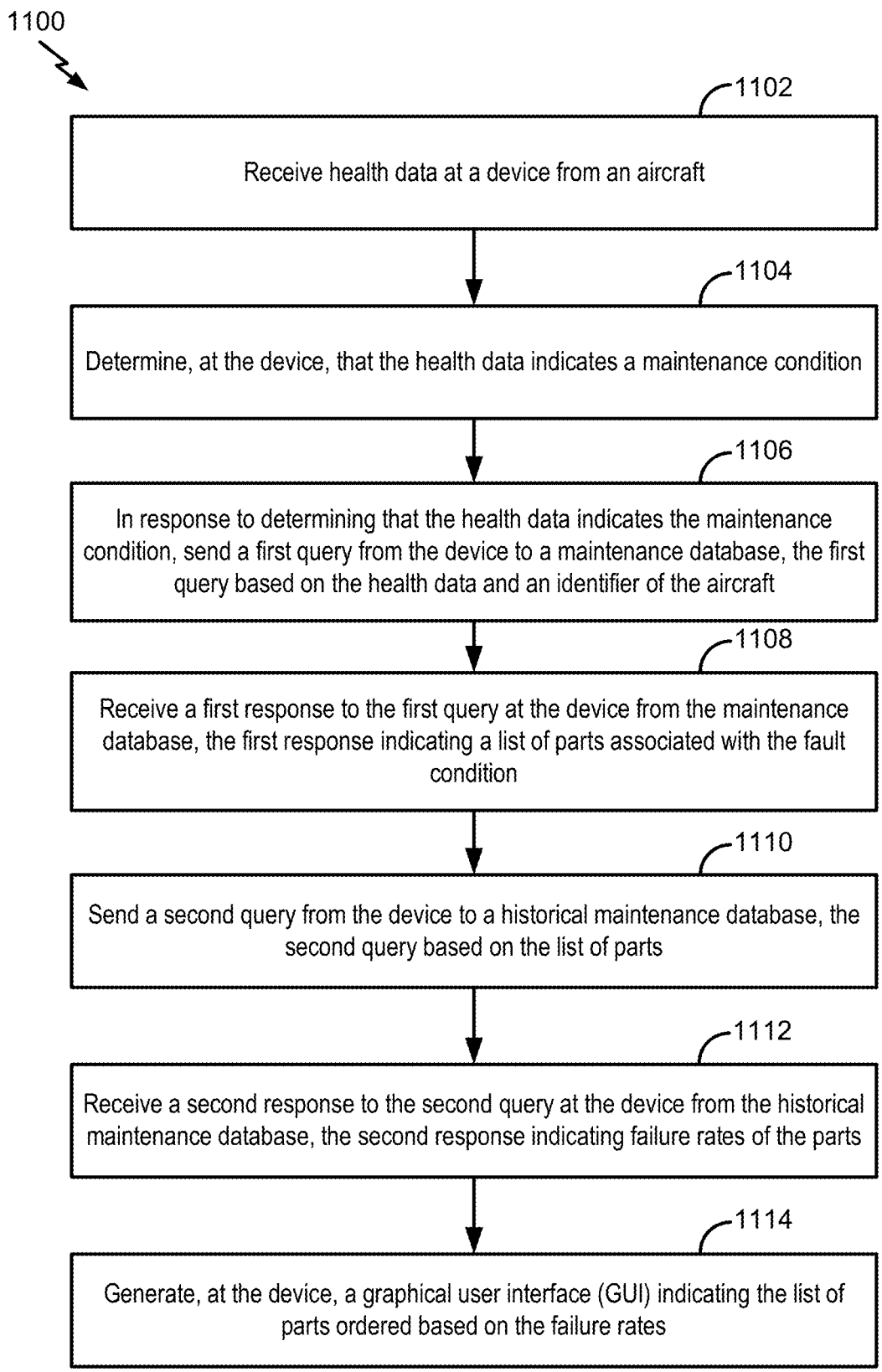
FIG. 11 is a flow chart of an example of a method of performing aircraft maintenance condition detection.

FIG. 11 is a flowchart of a method 1100 of performing aircraft maintenance condition detection. The method 1100 may be performed by the aircraft health data analyzer 120, the device 102, the system 100 of FIG. 1, or any combination thereof.

The method 1100 includes receiving health data at a device from an aircraft, at 1102. For example, the device 102 of FIG. 1 receives the health data 131 from the aircraft 104, as described with reference to FIG. 1.

The method 1100 also includes determining, at the device, that the health data indicates a maintenance condition, at 1104. For example, the aircraft health data analyzer 120 of FIG. 1 determines that the health data 131 indicates the maintenance condition 153, as described with reference to FIG. 1.

The method 1100 further includes, in response to determining that the health data indicates the maintenance condition, sending a first query from the device to a maintenance database, at 1106. For example, the aircraft health data analyzer 120 of FIG. 1, in response to determining that the health data 131 indicates the maintenance condition 153, sends the first query 133 to the maintenance database 106, as described with reference to FIG. 1. The first query 133 is based on the health data 131 and the aircraft ID 151.

The method 1100 also includes receiving a first response to the first query at the device from the maintenance database, at 1108. For example, the aircraft health data analyzer 120 of FIG. 1 receives the first response 135 to the first query 133 from the maintenance database 106. The first response 135 indicates the parts list 155 associated with the maintenance condition 153.

The method 1100 further includes sending a second query from the device to a historical maintenance database, at 1110. For example, the aircraft health data analyzer 120 of FIG. 1 sends the second query 137 to the historical maintenance database 108. The second query 137 is based on the parts list 155.

The method 1100 also includes receiving a second response to the second query at the device from the historical maintenance database, at 1112. For example, the aircraft health data analyzer 120 of FIG. 1 receives the second response 139 from the historical maintenance database 108. The second response 139 indicates the failure rates 157 of the parts indicated by the parts list 155.

The method 1100 further includes generating, at the device, a graphical user interface (GUI) indicating the list of parts ordered based on the failure rates, at 1114. For example, the aircraft health data analyzer 120 of FIG. 1 generates the GUI 141 indicating the parts list 155 ordered based on the failure rates 157, as described with reference to FIG. 1.

The method 1100 thus enables detecting the maintenance condition 153 at the aircraft 104, identifying parts that are associated with the maintenance condition 153, and generating the GUI 141 indicating the parts ordered based on the failure rates 157. The GUI 141 enables the user 101 to determine which parts are more likely to be a cause of the maintenance condition 153. The user 101 could select parts to be repaired that have a higher probability of being associated with the maintenance condition 153. The parts could be ordered from suppliers prior to the aircraft 104 landing on the ground, expediting the repairs of the aircraft 104.

Figure 12:
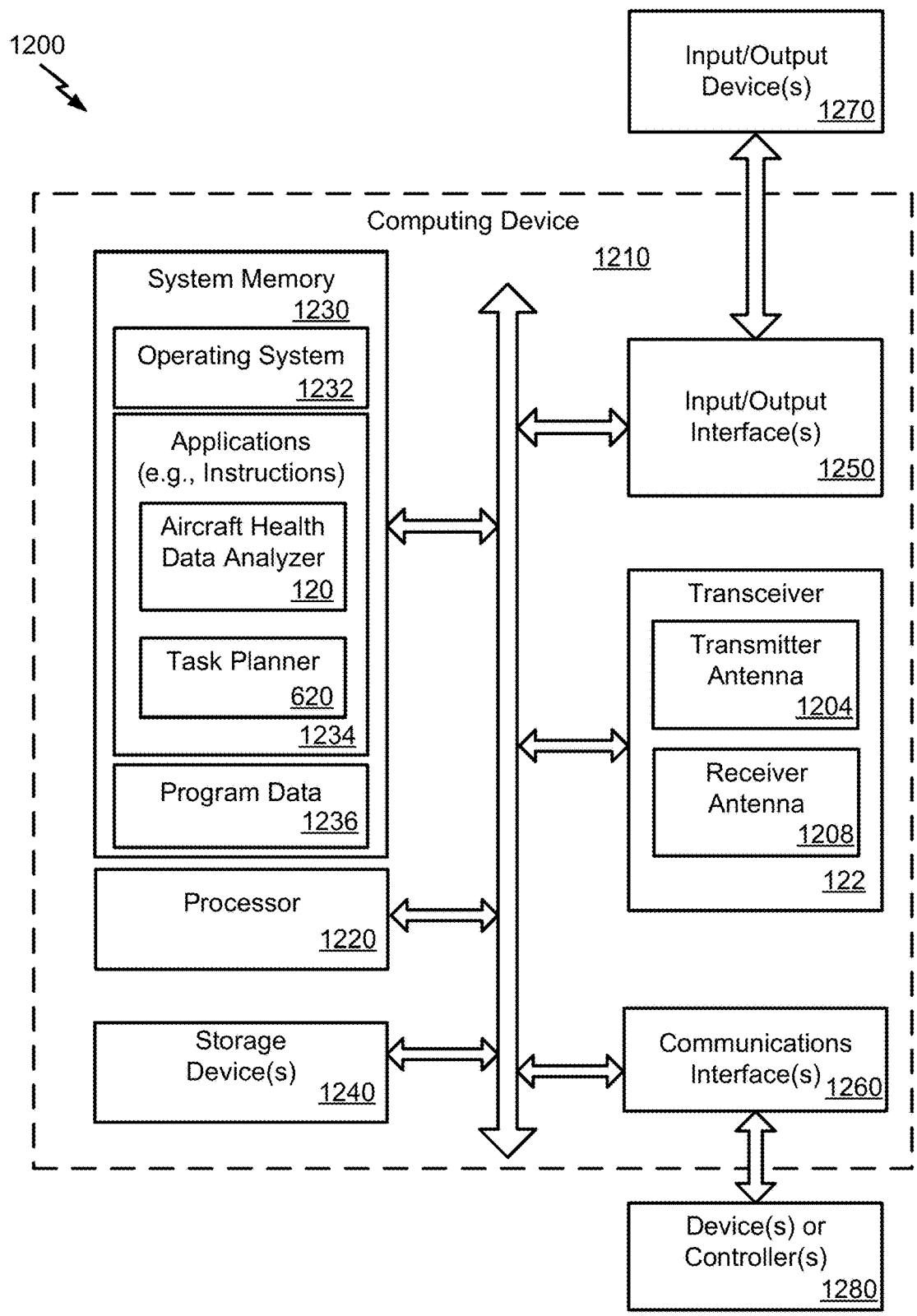
FIG. 12 is an illustration of a block diagram of a computing environment including a general purpose computing device configured to support aspects of computer-implemented methods and computer-executable program instructions (or code) according to the present disclosure.

FIG. 12 is an illustration of a block diagram of a computing environment 1200 including a general purpose computing device 1210 configured to support aspects of computer-implemented methods and computer-executable program instructions (or code) according to the present disclosure. For example, the computing device 1210, or portions thereof, is configured to execute instructions to initiate, perform, or control one or more operations described with reference to FIGS. 1-11.

The computing device 1210 includes the transceiver 122. In the example of FIG. 12, the transceiver 122 includes a transmitter antenna 1204 and the receiver antenna 1208. In a particular aspect, the transmitter antenna 1204 is distinct from the receiver antenna 1208. In an alternate aspect, the transmitter antenna 1204 is the same as the receiver antenna 1208. In a particular example, a single antenna includes the transmitter antenna 1204 and the receiver antenna 1208. The computing device 1210 includes a processor 1220. The processor 1220 is configured to communicate with system memory 1230, one or more storage devices 1240, one or more input/output interfaces 1250, one or more communications interfaces 1260, or any combination thereof. The system memory 1230 includes volatile memory devices (e.g., random access memory (RAM) devices), nonvolatile memory devices (e.g., read-only memory (ROM) devices, programmable read-only memory, and flash memory), or both. In a particular implementation, the system memory 1230 includes the memory 132 of FIG. 1. The system memory 1230 stores an operating system 1232, which may include a basic/input output system for booting the computing device 1210 as well as a full operating system to enable the computing device 1210 to interact with users, other programs, and other devices. The system memory 1230 stores system (program) data 1236.

The system memory 1230 includes one or more applications 1234 executable by the processor 1220. As an example, the one or more applications 1234 include instructions executable by the processor 1220 to initiate, control, or perform one or more operations described with reference to FIGS. 1-11. To illustrate, the one or more applications 1234 include instructions executable by the processor 1220 to initiate, control, or perform one or more operations described with reference to the aircraft health data analyzer 120, the task planner 620, or both.

The processor 1220 is configured to communicate with one or more storage devices 1240. For example, the one or more storage devices 1240 include nonvolatile storage devices, such as magnetic disks, optical disks, or flash memory devices. In a particular example, the storage devices 1240 include both removable and non-removable memory devices. The storage devices 1240 are configured to store an operating system, images of operating systems, applications, and program data. In a particular aspect, the system memory 1230, the storage devices 1240, or both, include tangible computer-readable media. In a particular aspect, the storage devices 1240 include the maintenance database 106, the historical maintenance database 108 of FIG. 1, the logistics database 406 of FIG. 4, the task planning DB 606 of FIG. 6, or any combination thereof. In a particular aspect, one or more of the storage devices 1240 are external to the computing device 1210.

The processor 1220 is configured to communicate with one or more input/output interfaces 1250 that enable the computing device 1210 to communicate with one or more input/output devices 1270 to facilitate user interaction. For example, the one or more input/output interfaces 1250 include the display interface 126, the input interface 128 of FIG. 1, or both. In a particular example, the input/output devices 1270 include the display 110 of FIG. 1. The processor 1220 is configured to detect interaction events based on user input received via the input/output interfaces 1250. Additionally, the processor 1220 is configured to send a display to a display device via the input/output interfaces 1250. The processor 1220 is configured to communicate with devices or controllers 1280 via the one or more communications interfaces 1260. For example, the one or more communication interfaces 1260 include the network interface 124 of FIG. 1.

In an illustrative example, a non-transitory computer-readable storage medium (e.g., the system memory 1230) includes instructions that, when executed by a processor (e.g., the processor 1220), cause the processor to initiate, perform, or control operations. The operations include one or more operations described with reference to FIGS. 1-11.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
a transceiver configured to receive first health data and second health data from an aircraft;
a processor configured to:
generate a request for particular health data, the request for the particular health data generated based on the first health data; and
determine whether the second health data indicates a maintenance condition;
a network interface configured to:
send the request for the particular health data to the aircraft, wherein the second health data is received from the aircraft responsive to the request for the particular health data; and
responsive to the second health data indicating the maintenance condition:
send a first query to a maintenance database, the first query based on the second health data and an identifier of the aircraft, the maintenance database distinct from the aircraft;
receive a first response to the first query from the maintenance database, the first response indicating one or more parts associated with the maintenance condition;
send a second query to a historical maintenance database, the second query based on the one or more parts, the historical maintenance database distinct from the aircraft and the maintenance database; and
receive a second response to the second query from the historical maintenance database, the second response indicating failure rates of the one or more parts; and
a display interface configured to provide a graphical user interface (GUI) to a display, wherein the processor is configured to generate the GUI indicating the one or more parts ordered based on the failure rates.

2. The device of claim 1, wherein the second health data includes at least one of sensor data or on-board analysis data.

3. The device of claim 1, wherein the processor is further configured to determine whether the second health data indicates a plurality of maintenance conditions, wherein the plurality of maintenance conditions includes the maintenance condition, and wherein the GUI includes an option to select multiple maintenance conditions of the plurality of maintenance conditions to display a list of parts associated with the multiple maintenance conditions.

4. The device of claim 1, wherein the second health data is received while the aircraft is in flight.

5. The device of claim 1, wherein the maintenance database comprises first data identifying a plurality of maintenance conditions, each maintenance condition of the plurality of maintenance conditions associated with a plurality of parts, wherein the historical maintenance database includes second data identifying a prior maintenance operation performed on a first part of the one or more parts, and wherein the failure rates are based in part on the prior maintenance operation.

6. The device of claim 1, wherein the transceiver is further configured to receive location data from the aircraft, and wherein the network interface is configured to:
send a third query to a logistics database, the third query based on the location data; and
receive a third response to the third query from the logistics database, the third response indicating availability of the one or more parts at particular locations, wherein the GUI is configured to indicate the availability of the one or more parts at the particular locations.

7. The device of claim 1, wherein the network interface is configured to send, to a second aircraft, at least a portion of the second health data, data identifying the one or more parts, or both.

8. The device of claim 1, wherein the GUI includes a requisition option, wherein the processor is configured to generate a supply request in response to receiving a user selection of the requisition option, wherein the supply request indicates the one or more parts, one or more items to be used to replace the one or more parts, one or more technicians qualified to replace the one or more parts, or any combination thereof, and wherein the network interface is configured to send the supply request to a supplier.

9. The device of claim 1, further comprising a transmitter configured to transmit a message to the aircraft for display to a pilot, wherein the processor is configured to generate the message based on the one or more parts.

10. The device of claim 1, wherein the transceiver is further configured to receive second data from a second aircraft, wherein the first query is based on the second data.

11. A method comprising:
receiving first health data at a device from an aircraft;
generating a request for particular health data, the request for the particular health data generated based on the first health data;
sending the request for the particular health data to the aircraft, wherein second health data is received from the aircraft responsive to the request for the particular health data;
determining, at the device, that the second health data indicates a maintenance condition;
in response to determining that the second health data indicates the maintenance condition:
sending a first query from the device to a maintenance database, the first query based on the second health data and an identifier of the aircraft, the maintenance database offboard the aircraft;

receiving a first response to the first query at the device from the maintenance database, the first response indicating one or more parts associated with the maintenance condition;

sending a second query from the device to a historical maintenance database, the second query based on the one or more parts, the historical maintenance database offboard the aircraft and distinct from the maintenance database;

receiving a second response to the second query at the device from the historical maintenance database, the second response indicating failure rates of the one or more parts; and generating, at the device, a graphical user interface (GUI) indicating the one or more parts ordered based on the failure rates.

12. The method of claim 11, further comprising:

determining, at the device, that the aircraft is assigned to perform a first task that uses one or more first resources; and determining, at the device, that the aircraft is unable to perform the first task in response to determining that the maintenance condition indicates that at least one of the first resources is unavailable at the aircraft, wherein the GUI is generated to indicate that the aircraft is unable to perform the first task.

13. The method of claim 12, further comprising, in response to determining that the aircraft is unable to perform the first task:

sending a third query from the device to a task planning database, the third query indicating the first task, the first resources, or any combination thereof;

receiving a third response to the third query at the device from the task planning database;

determining, at the device, that a second aircraft is able to perform the first task based on determining that the third response indicates that the first resources are available at the second aircraft; and assigning the first task to the second aircraft based at least in part on determining that the second aircraft is able to perform the first task.

14. The method of claim 13, further comprising, prior to assigning the first task to the second aircraft:

determining, at the device, that the third response indicates that a second task is assigned to the second aircraft and that the second task uses one or more second resources;

determining, at the device, that the aircraft is able to perform the second task in response to determining that the second health data indicates that the one or more second resources are available at the aircraft; and assigning, at the device, the second task to the aircraft in response to determining that the aircraft is able to perform the second task and that the second aircraft is able to perform the first task, wherein the first task is assigned to the second aircraft based on determining that the aircraft is able to perform the second task.

15. A computer-readable storage device storing instructions that, when executed by a processor, cause the processor to perform operations comprising:

receiving first health data from an aircraft;

generating, based on the first health data, a request for particular health data;

directing the request for the particular health data to the aircraft, wherein second health data is received from the aircraft responsive to the request for the particular health data;

determining that the second health data indicates a maintenance condition;

in response to determining that the second health data indicates the maintenance condition:

directing a first query to a maintenance database, the first query based on the second health data and an identifier of the aircraft, the maintenance database offboard the aircraft;

receiving a first response to the first query from the maintenance database, the first response indicating one or more parts associated with the maintenance condition;

directing a second query to a historical maintenance database, the second query based on the one or more parts, the historical maintenance database offboard the aircraft and distinct from the maintenance database;

receiving a second response to the second query from the historical maintenance database, the second response indicating failure rates of the one or more parts; and generating a graphical user interface (GUI) indicating the one or more parts ordered based on the failure rates.

16. The computer-readable storage device of claim 15, wherein the first health data includes first values sampled at a first data sampling frequency.

17. The computer-readable storage device of claim 16, wherein the request for the particular health data indicates a second data sampling frequency, and wherein the second health data includes second values sampled at the second data sampling frequency.

18. The computer-readable storage device of claim 16, wherein the request for the particular health data indicates a test, and wherein the second health data includes results of performing the test at the aircraft.

19. The computer-readable storage device of claim 16, wherein the request for the particular health data indicates a first parameter, wherein a value of the first parameter is included in the first health data, and wherein the first parameter is excluded from the second health data.

20. The computer-readable storage device of claim 16, wherein the request for the particular health data indicates a second parameter that is excluded from the first health data, and wherein the second health data includes a value of the second parameter.

* * * * *